(12) United States Patent
Hayakawa et al.

(10) Patent No.: US 10,482,368 B2
(45) Date of Patent: Nov. 19, 2019

(54) ELECTRONIC APPARATUS AND WIRELESS COMMUNICATION SYSTEM

(71) Applicant: OMRON Corporation, Kyoto (JP)

(72) Inventors: Masayuki Hayakawa, Kizugawa (JP); Seiji Tanaka, Okayama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/751,154

(22) PCT Filed: Feb. 9, 2017

(86) PCT No.: PCT/JP2017/004805
§ 371 (c)(1),
(2) Date: Feb. 7, 2018

(87) PCT Pub. No.: WO2017/159145
PCT Pub. Date: Sep. 21, 2017

(65) Prior Publication Data
US 2018/0232618 A1    Aug. 16, 2018

(30) Foreign Application Priority Data

Mar. 15, 2016  (JP) .................................. 2016-051576

(51) Int. Cl.
*G06K 19/077*   (2006.01)
*H04B 1/59*   (2006.01)
(Continued)

(52) U.S. Cl.
CPC ......... *G06K 19/07773* (2013.01); *H04B 1/59* (2013.01); *H04W 4/50* (2018.02); *H04W 4/80* (2018.02)

(58) Field of Classification Search
CPC .... G06K 19/07773; H04W 4/80; H04W 4/50; H04B 1/59
See application file for complete search history.

(56) References Cited

U.S. PATENT DOCUMENTS

| | | | | |
|---|---|---|---|---|
| 2012/0164944 A1* | 6/2012 | Yamaoka | ........... | G06K 7/10198 455/41.1 |
| 2013/0057911 A1* | 3/2013 | Hirakawa | .......... | H04N 1/00342 358/1.15 |
| 2014/0145823 A1* | 5/2014 | Aase | .................. | G07C 9/00309 340/5.61 |

FOREIGN PATENT DOCUMENTS

| | | |
|---|---|---|
| CN | 102484499 | 5/2012 |
| CN | 103839313 | 6/2014 |

(Continued)

OTHER PUBLICATIONS

"International Search Report (Form PCT/ISA/210)" of PCT/JP2017/004805, dated May 16, 2017, with English translation thereof, pp. 1-4.

(Continued)

*Primary Examiner* — Sonji N Johnson
(74) *Attorney, Agent, or Firm* — JCIPRNET

(57) ABSTRACT

The present invention addresses the problem of preventing the malfunction of an electronic apparatus containing an RFID module with a wired communication port. An electronic apparatus is provided with: an RFID module containing an antenna, a control circuit, a memory connected to the control circuit, and a wired communication port; a processing unit connected to the RFID module via the wired communication port; and a switch that electrically connects or interrupts the antenna and the control circuit.

18 Claims, 22 Drawing Sheets

(51) Int. Cl.
*H04W 4/50* (2018.01)
*H04W 4/80* (2018.01)

(56) References Cited

FOREIGN PATENT DOCUMENTS

| | | | | |
|---|---|---|---|---|
| JP | 2005-128846 | 5/2005 | | |
| JP | 2005128846 A | * 5/2005 | .............. | F24F 11/30 |
| JP | 2005148820 | 6/2005 | | |
| JP | 2006-5633 | 1/2006 | | |
| JP | 2006154923 | 6/2006 | | |
| JP | 2006-268410 | 10/2006 | | |
| JP | 2006268410 A | * 10/2006 | | |
| JP | 2009-537887 | 10/2009 | | |
| JP | 2012238191 | 12/2012 | | |
| JP | 2013-52556 | 3/2013 | | |
| JP | 2016025568 | 2/2016 | | |
| WO | 2012004939 | 1/2012 | | |

OTHER PUBLICATIONS

"Written Opinion of the International Searching Authority (Form PCT/ISA/237)" of PCT/JP2017/004805, dated May 16, 2017, with English translation thereof, pp. 1-8.
"Office Action of Japan Counterpart Application," dated Jul. 31, 2018, with English translation thereof, p. 1-p. 6.
"Office Action of China Counterpart Application", dated Jul. 5, 2019, with English translation thereof, pp. 1-15.
"Search Report of Europe Counterpart Application", dated Aug. 28, 2019, pp. 1-9.

* cited by examiner (a)

(b)

Table of X company Y factory

|  | | B Line | C Line |
|---|---|---|---|
| Type: TA20 | Setting file OMRTA20-XYA2 | Setting file OMRTA20-XYB1 | — |
| Type: TA120 | — | — | Setting file OMRTA120-XYC1 |
| Type: TA220 | — | — | — |

Table of X company W factory

|  | D Line | E Line | F Line |
|---|---|---|---|
| Type: TA20 | — | — | Setting file OMRTA20-XWF1 |
| Type: TA120 | — | Setting file OMRTA120-XWE1 | — |
| Type: TA220 | Setting file OMRTA220-XWD1 | — | — |

(a)

(b)

Table of X company Y factory

|  | A Line | B Line | C Line |
|---|---|---|---|
| Type: TA20 | Setting file OMRTA20-XYA1 | Setting file OMRTA20-XYB1 | — |
| Type: TA120 | — | — | Setting file OMRTA120-XYC1 |
| Type: TA220 | — | — | — |

Table of W company Y factory

|  | D Line | E Line | F Line |
|---|---|---|---|
| Type: TA20 | — | — | Setting file OMRTA20-XWF1 |
| Type: TA120 | — | Setting file OMRTA120-XWE1 | — |
| Type: TA220 | Setting file OMRTA220-XWD1 | — | — |

ELECTRONIC APPARATUS AND WIRELESS COMMUNICATION SYSTEM

CROSS-REFERENCE TO RELATED APPLICATION

This application is a 371 of international application of PCT application serial no. PCT/JP2017/004805, filed on Feb. 9, 2017, which claims the priority benefit of Japan application no. 2016-051576, filed on Mar. 15, 2016. The entirety of each of the abovementioned patent applications is hereby incorporated by reference herein and made a part of this specification.

TECHNICAL FIELD

The present invention relates to an electronic apparatus and a wireless communication system.

BACKGROUND ART

Patent Literature 1 discloses a configuration in which an RFID module including a wired communication port is provided in an electronic apparatus and the wired communication port of the RFID module is connected to a control circuit of the electronic apparatus. According to such a configuration, a setting value of the electronic apparatus can be used for controlling the electronic apparatus by storing the setting value in a storage circuit of the RFID module.

CITATION LIST

Patent Literature

Patent Literature 1

Japanese Unexamined Patent Application Publication No. 2006-5633 (published on Jan. 5, 2006)

Patent Literature 2

Japanese Unexamined Patent Application Publication No. 2009-537887 (published on Oct. 29, 2009)

SUMMARY OF INVENTION

Technical Problem

In an electronic apparatus including a wireless communication module with a wired communication port with such a configuration, there is an advantage regarding the ease of wireless writing of a setting value of an electronic apparatus to the wireless communication module, but countermeasures to prevent an erroneous operation of the electric apparatus due to a setting value which is not appropriate are required.

An object of the present invention is to prevent an erroneous operation of an electronic apparatus including a wireless communication module with a wired communication port.

Solution to Problem

An electronic apparatus according to the present invention includes: a wireless communication module including an antenna, a control circuit, a memory connected to the control circuit, and a wired communication port; a processing unit connected to the wireless communication module via the wired communication port; and a switch configured to electrically connect or interrupt the antenna and the control circuit.

Advantageous Effects of Invention

An erroneous operation of an electronic apparatus including a wireless communication module with a wired communication port can be prevented.

DESCRIPTION OF EMBODIMENTS

Embodiments of the present invention will be described with reference to FIGS. 1 to 22. An electronic apparatus is a thermostat as one example in the following description, but may be a factory automation (FA) apparatus such as a timer, a counter, a sensor, or a controller, a medical apparatus, or the like and is not particularly limited. Furthermore, although examples of wireless communication include a radio frequency identification (RFID) system, the wireless communication may be a system using infrared communication and is not particularly limited.

Embodiment 1

Figure 1:
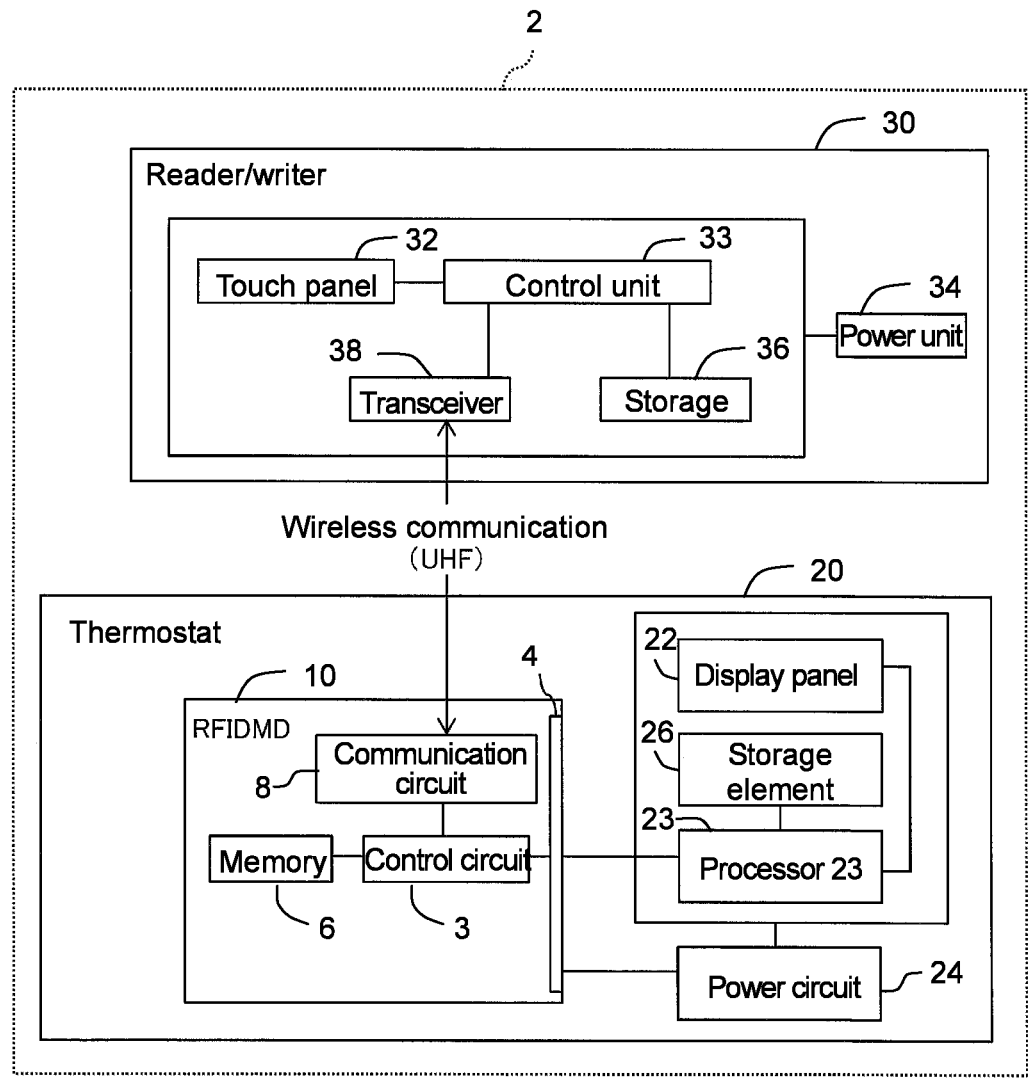
FIG. 1 is a block diagram showing a wireless communication system according to Embodiment 1.

As shown in FIG. 1, a wireless communication system 2 according to Embodiment 1 includes a thermostat 20 in which an RFID module (hereinafter abbreviated as "RFIDMD" or "MD" in some cases) 10 is built and a reader/writer 30.

The reader/writer 30 includes a touch panel 32, a transceiver 38, a storage 36, a control unit 33, and a power supply 34.

The thermostat 20 includes a display panel 22, a storage element 26, a processor 23, a power circuit 24, and the RFID module 10 which includes a communication circuit 8, a memory 6 (for example, an FRAM (registered trademark)), a control circuit 3, and a wired communication port 4. In addition, wireless communication (for example, in a UHF band) is performed between an antenna included in the communication circuit 8 and an antenna included in the transceiver 38 of the reader/writer 30. In other words, the reader/writer 30 can perform wireless writing to the memory 6 of the RFID module 10 and perform wireless reading from the memory 6.

The control circuit 3 of the RFID module 10 is connected to the processor 23 and the power circuit 24 via the wired communication port 4 and the processor 23 can perform wired writing to the memory 6 of the RFID module 10 and perform wired reading from the memory 6. The power circuit 24 supplies electric power to the display panel 22, the processor 23, the storage element 26, and the RFID module 10. Note that, when the power circuit 24 is off, the RFID module 10 is a passive type and electric power generated by the communication circuit 8 during wireless communication with the reader/writer 30 is used in the control circuit 3 and the memory 6.

The thermostat 20 is shipped to a user (for example, an agency) after a type TA20 of the thermostat 20 is wirelessly written to the memory 6 of the RFID module 10 and predetermined data (which will be described below) is stored in the storage element 26.

Figure 2:
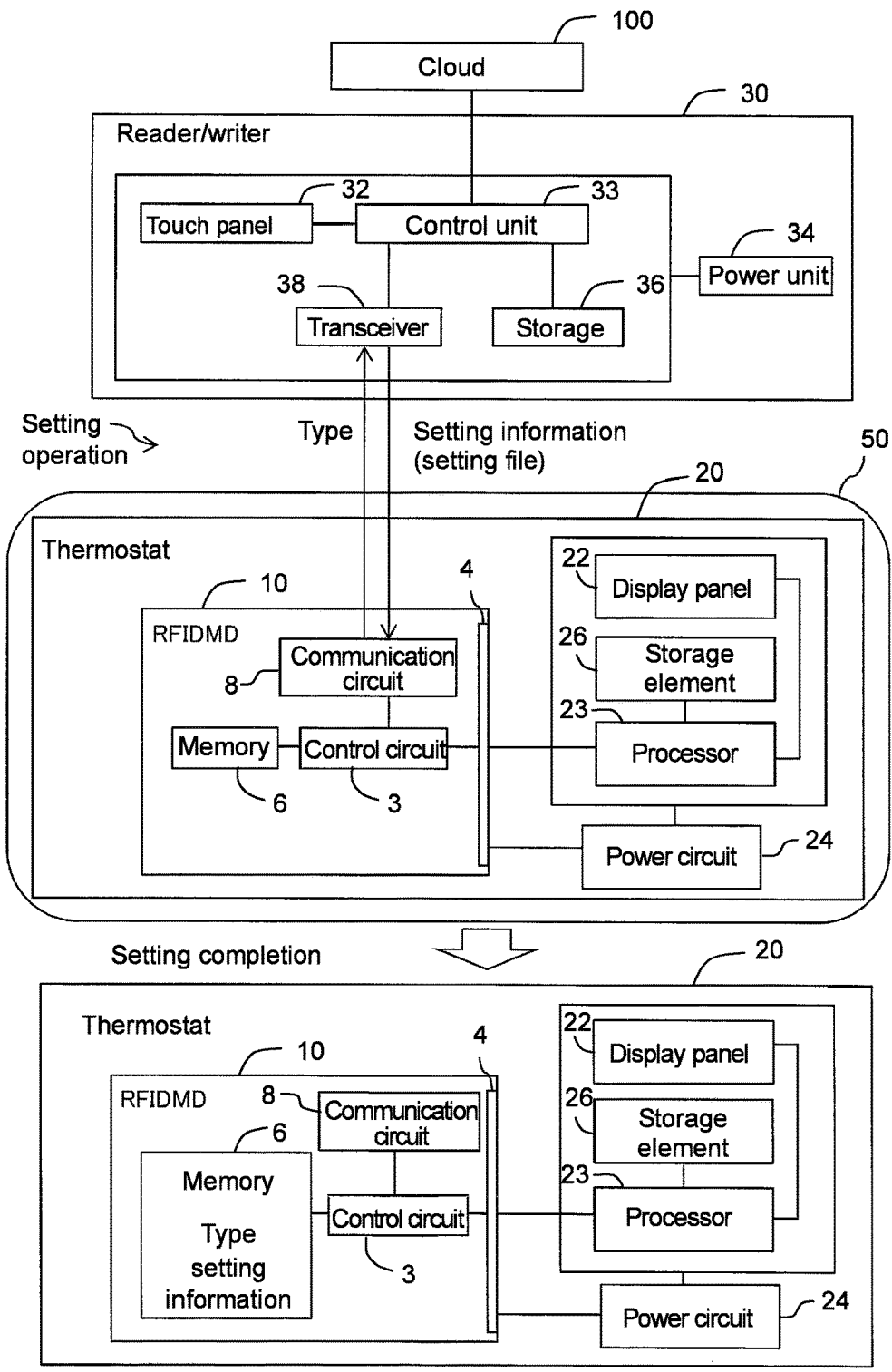
FIG. 2 is a block diagram for describing a setting operation of the wireless communication system according to Embodiment 1.
Figure 3:
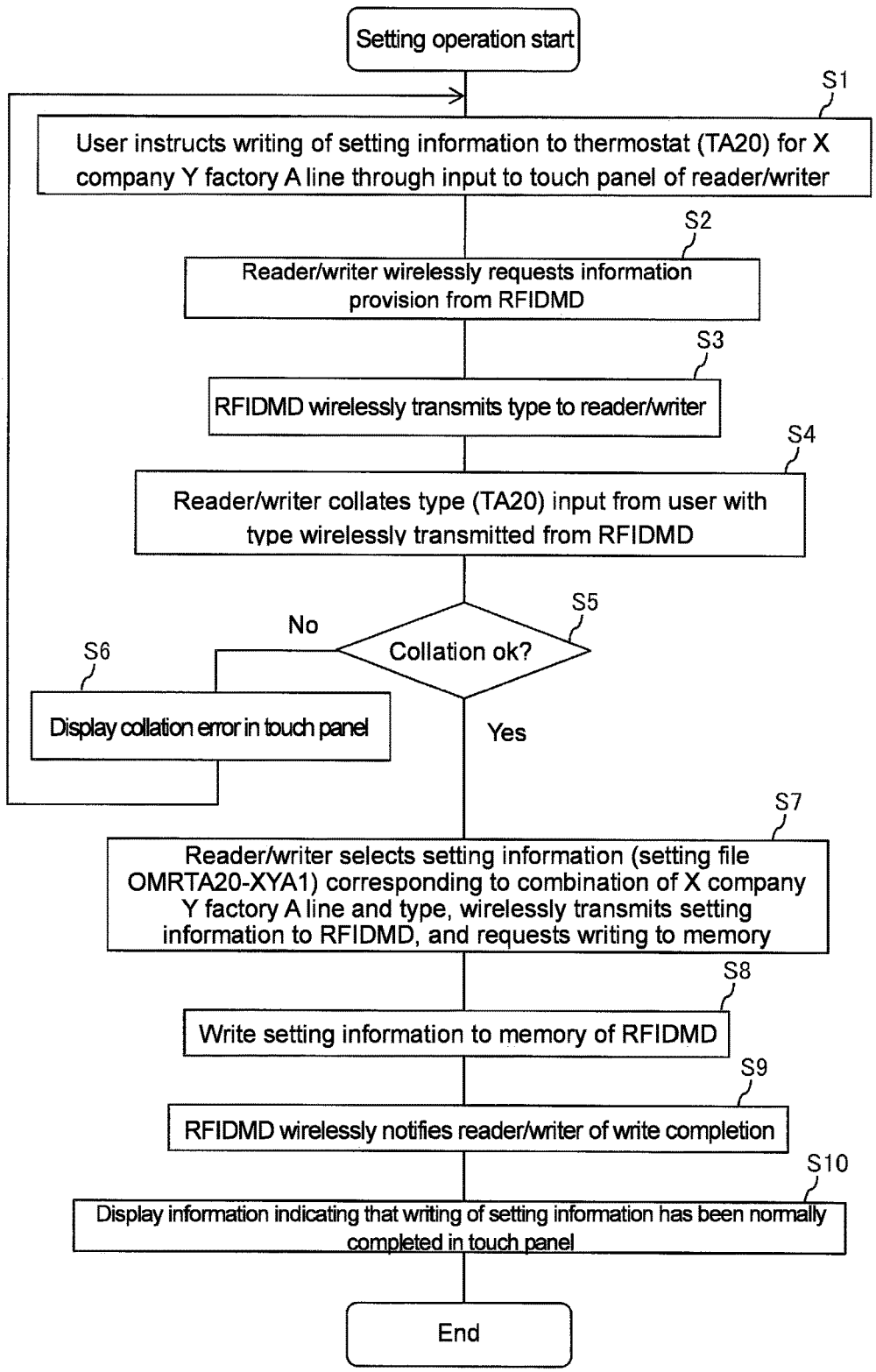
FIG. 3 is a flowchart for describing a setting operation in Embodiment 1.
Figure 4:
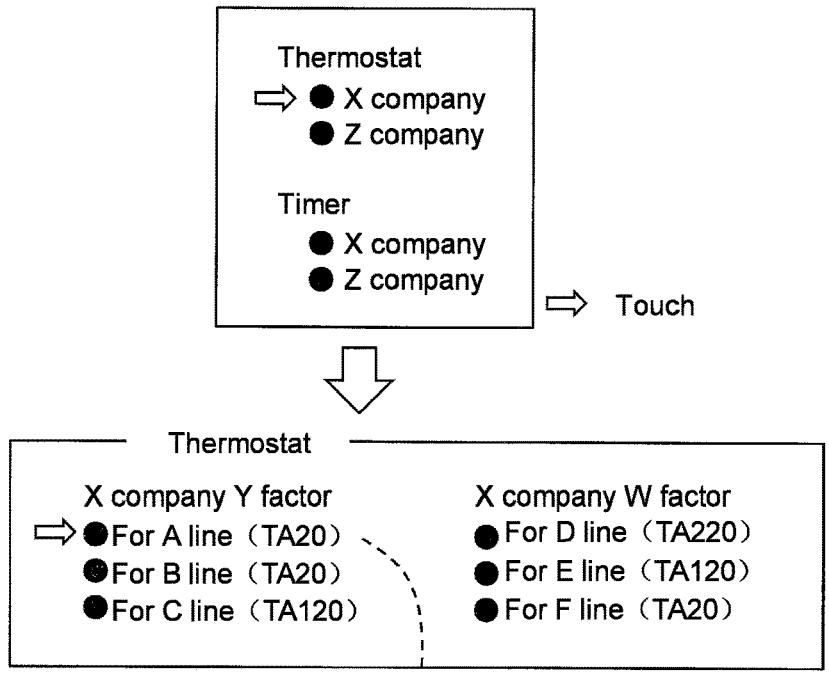
FIG. 4 is an explanatory diagram for describing an input process of the setting operation in Embodiment 1.

In Embodiment 1, as shown in FIGS. 2 to 4, a setting operation (writing of setting information to the RFID module) of the thermostat 20 is performed. Such a setting operation (also referred to as a "dispatch operation") is generally performed in, for example, an agency serving as the user in a state in which a thermostat 20 is put in a packing box 50 (a passive state).

First, the user instructs writing of setting information to the thermostat (type: TA20) for X company Y factory A line through an input to the touch panel 32 of the reader/writer 30 (Step S1). In Step S1, as shown in (a) of FIG. 4, the user selects "X company" in a thermostat column in a touch manner and then selects "for A line (TA20)" of an X company Y factory column in a touch manner.

The control unit 33 of the reader/writer 30 receives an instruction from the user in Step S1 and wirelessly transmits an information provision request signal from the transceiver 38 to the RFID module 10 (built in the thermostat 20 in the packing box 50) (Step S2).

In the RFID module 10, the control circuit 3 receives the information provision request signal in Step S2 via the communication circuit 8 and wirelessly transmits the type (TA20) of the thermostat 20 written to the memory 6 from the communication circuit 8 to the reader/writer 30 (Step S3).

In the reader/writer 30, the control unit 33 receiving the type (TA 20) in Step S3 from the transceiver 38 collates the type (TA20) wirelessly transmitted from the RFID module 10 with a type (TA20) input by the user in cooperation with the storage 36 (Step S4).

If a collation result in Step S5 (collation OK?) is NO (the types do not match with each other), the control unit 33 displays a collation error in the touch panel 32 (Step S6). On the other hand, if a collation result in Step S5 (collation OK?) is YES (the types match with each other), the control unit 33 selects setting information (setting file OMRTA20-XYA1) corresponding to a combination of X company Y factory A line and the type (TA20) from a table illustrated in (b) of FIG. 4 stored in the storage 36, wirelessly transmits the setting information (setting file OMRTA20-XYA1) from the transceiver 38 to the RFID module 10, and requests writing of the setting information to the memory 6 (Step S7).

A setting file includes various setting values such as a target value corresponding to a destination or a type of sensor to be used. Furthermore, a name of the setting file includes type information (TA20), destination formation (specification information), and version information (XYA1) of the thermostat 20. As described below, "OMRTA20" of the first part is identification information and serves as a password when the thermostat is started up.

In the RFID module 10, the control circuit 3 receives a write request of setting information (setting file OMRTA20-XYA1) in Step S7 via the communication circuit 8 and writes the setting information (setting file OMRTA20-XYA1) to the memory 6 (Step S8). The control circuit 3 wirelessly transmits a write completion signal from the communication circuit 8 to the reader/writer 30 after the writing is completed (Step S9).

In the reader/writer 30, the control unit 33 receiving the write completion signal in Step S9 from the transceiver 38 displays information indicating that the writing of the setting information has been completed normally in the touch panel 32 (Step S10). Thus, the user recognizes that the setting operation (dispatch operation) has been performed properly.

Figure 5:
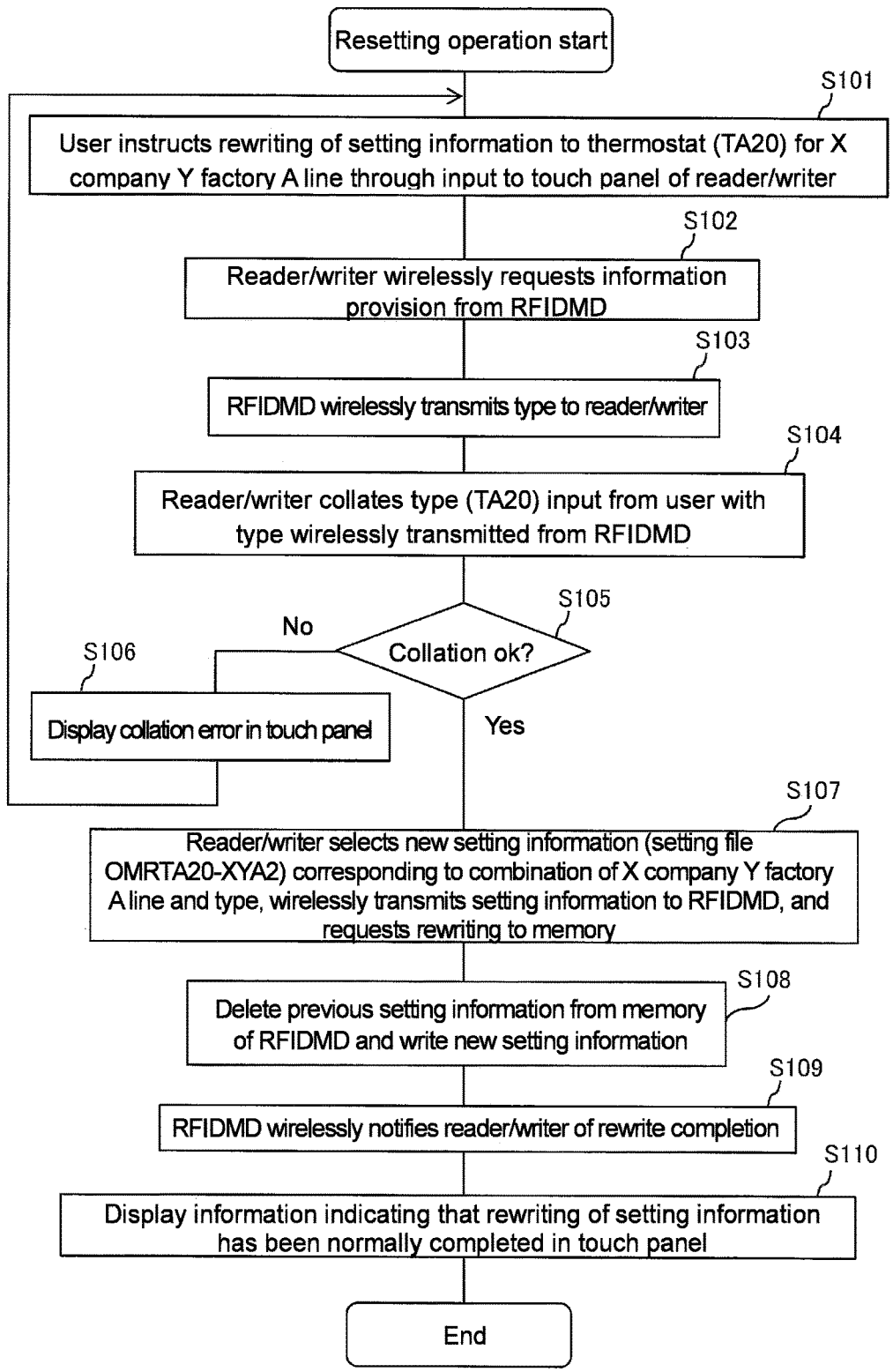
FIG. 5 is a flowchart for describing a resetting (setting update) operation in Embodiment 1.
Figure 6:
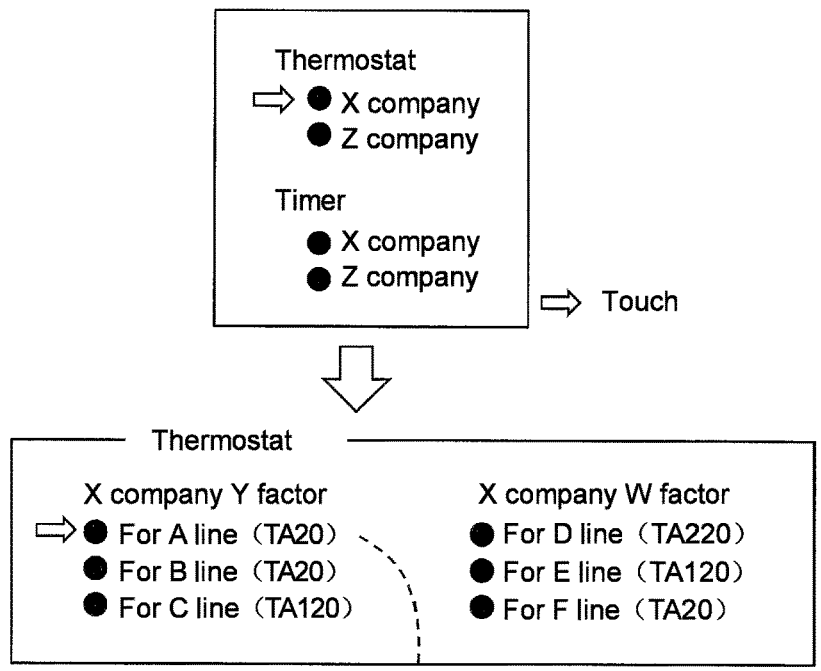
FIG. 6 is a flowchart for describing an input process of the resetting operation in Embodiment 1.

Note that, when setting information is desired to be changed or when there is a setting mistake after a setting operation, as shown in FIGS. 5 and 6, a resetting operation is performed.

In other words, in Step S101, the user performs an input on the touch panel 32 of the reader/writer 30 to instruct rewriting of setting information to a thermostat (TA20) for X company Y factory A line (refer to (a) of FIG. 6). Subsequently, in Step S102, the reader/writer 30 wirelessly requests information provision from the RFID module 10. Subsequently, in Step S103, the RFID module 10 wirelessly transmits the type (TA20) to the reader/writer 30. Subsequently, in Step S104, the reader/writer 30 collates the type (TA20) input by the user with a type wirelessly transmitted from the RFID module 10.

Subsequently, if a collation result in Step S105 (collation OK?) is NO (the types do not match with each other), a collation error is displayed in the touch panel 32 of the reader/writer 30 (Step S106). On the other hand, if a collation result in Step S105 is YES (the types match with each other), the reader/writer 30 selects new setting information (setting file OMRTA20-XYA2) corresponding to a combination of X company Y factory A line and a type from a table illustrated in (b) of FIG. 6, wirelessly transmits the new setting information (setting file OMRTA20-XYA2) to the RFID module 10, and requests rewriting to the memory 6 (Step S107). Thus, in Step S108, the previous setting information in the memory 6 of the RFID module 10 is deleted and the new setting information is written (setting information update).

Subsequently, in Step S109, the RFID module 10 wirelessly notifies the reader/writer 30 of rewrite completion. Subsequently, in Step S110, information indicating that the rewriting of the setting information has been completed normally is displayed in the touch panel 32.

Figure 7:
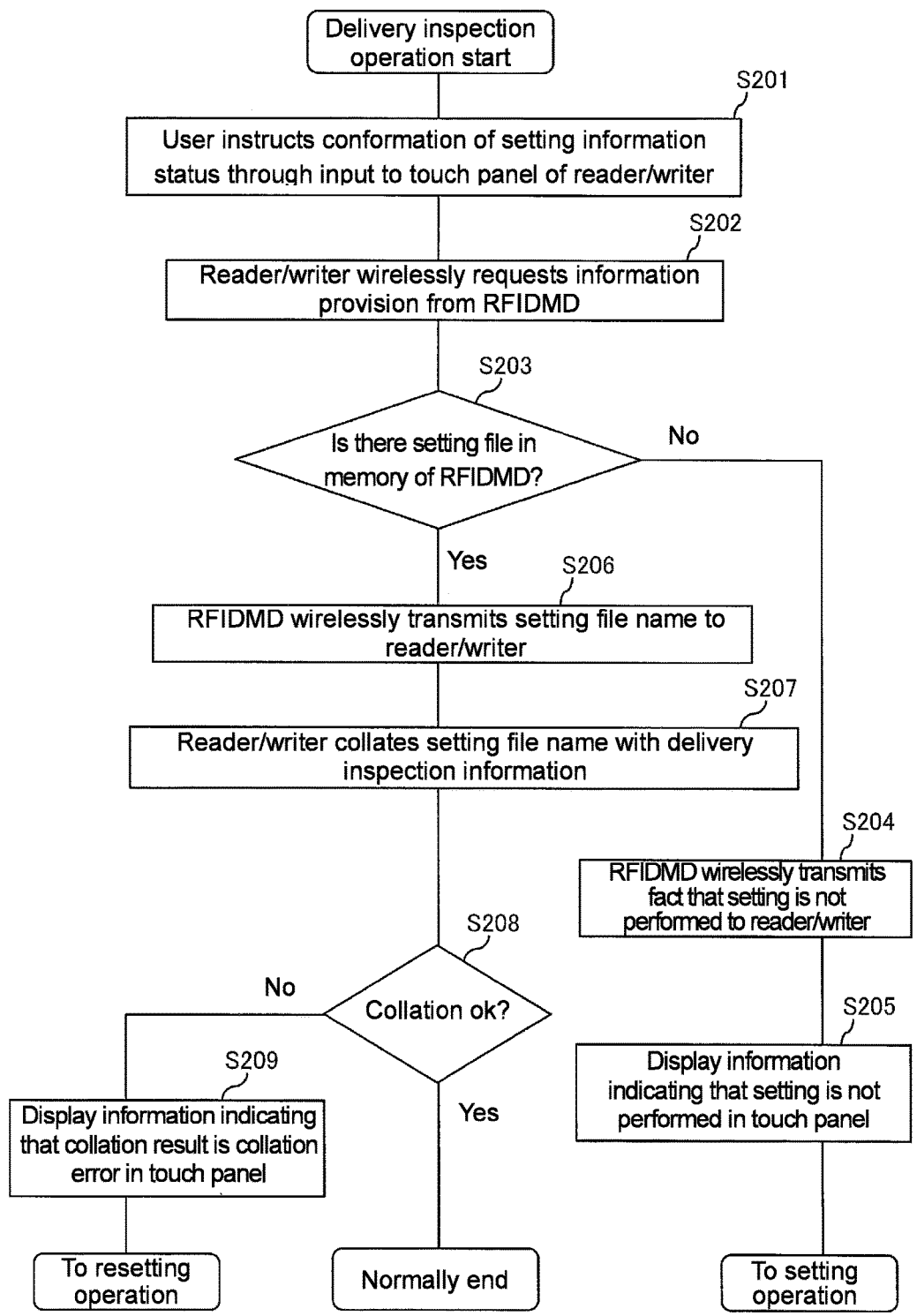
FIG. 7 is an explanatory diagram for describing the resetting (setting update) operation in Embodiment 1.

Also, as illustrated in FIG. 7, a setting information status is confirmed in a delivery inspection or the like after a setting operation.

In other words, in Step S201, the user performs an input on the touch panel 32 of the reader/writer 30 to instruct confirmation of the setting information status. Subsequently, in Step S202, the reader/writer 30 wirelessly requests information provision from the RFID module 10.

Subsequently, if a confirmation result in Step S203 (is there a setting file in the RFID module 10?) is NO (there is no setting file), the RFID module 10 wirelessly transmits information indicating that the setting is not performed (there is no setting file) to the reader/writer 30 (Step S204). In addition, information indicating that the setting is not performed is displayed in the touch panel 32 (Step S205) and the process transitions to the setting operation (writing of the setting information) of FIG. 3.

On the other hand, if a confirmation result in Step S203 is YES (there is a setting file), the RFID module 10 wirelessly transmits the setting file name (OMRTA20-XYA1) to the reader/writer 30 (Step S206) and the reader/writer 30 collates the setting file name with previously prepared delivery inspection information (database) (Step S207). In Step S207, for example, it is determined whether a type "TA20" and a destination "XYA" match the delivery inspection information or whether "1" in the ending serving as version information matches the delivery inspection information.

Subsequently, if a collation result in Step S208 (collation OK?) is YES, the inspection check operation is completed normally. On the other hand, if a collation result in Step S208 (collation OK?) is NO, information indicating that the collation result is a collation error is displayed in the touch panel 32 (Step S209) and the process transitions to a resetting operation (rewriting of setting information) of FIG. 5.

Figure 8:
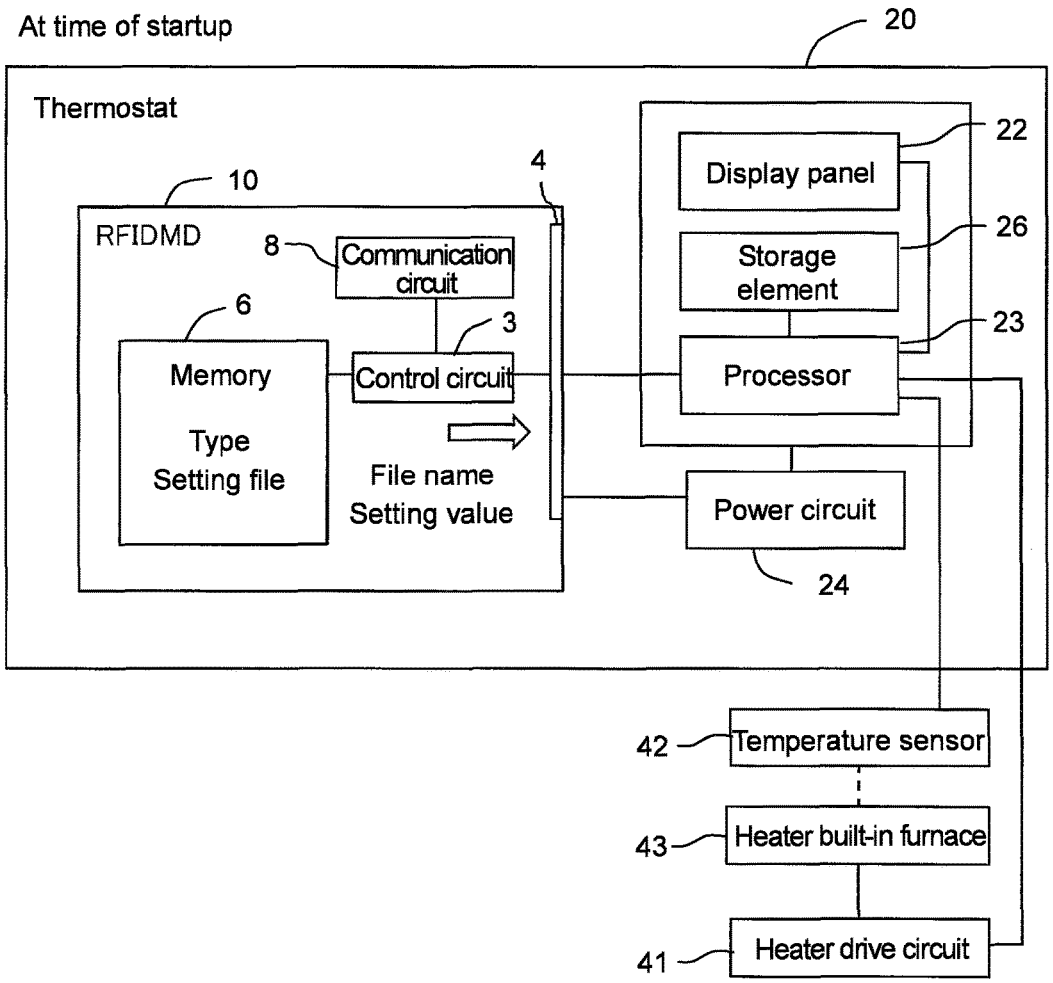
FIG. 8 is a block diagram for describing a state in which a thermostat is started up in Embodiment 1.
Figure 9:
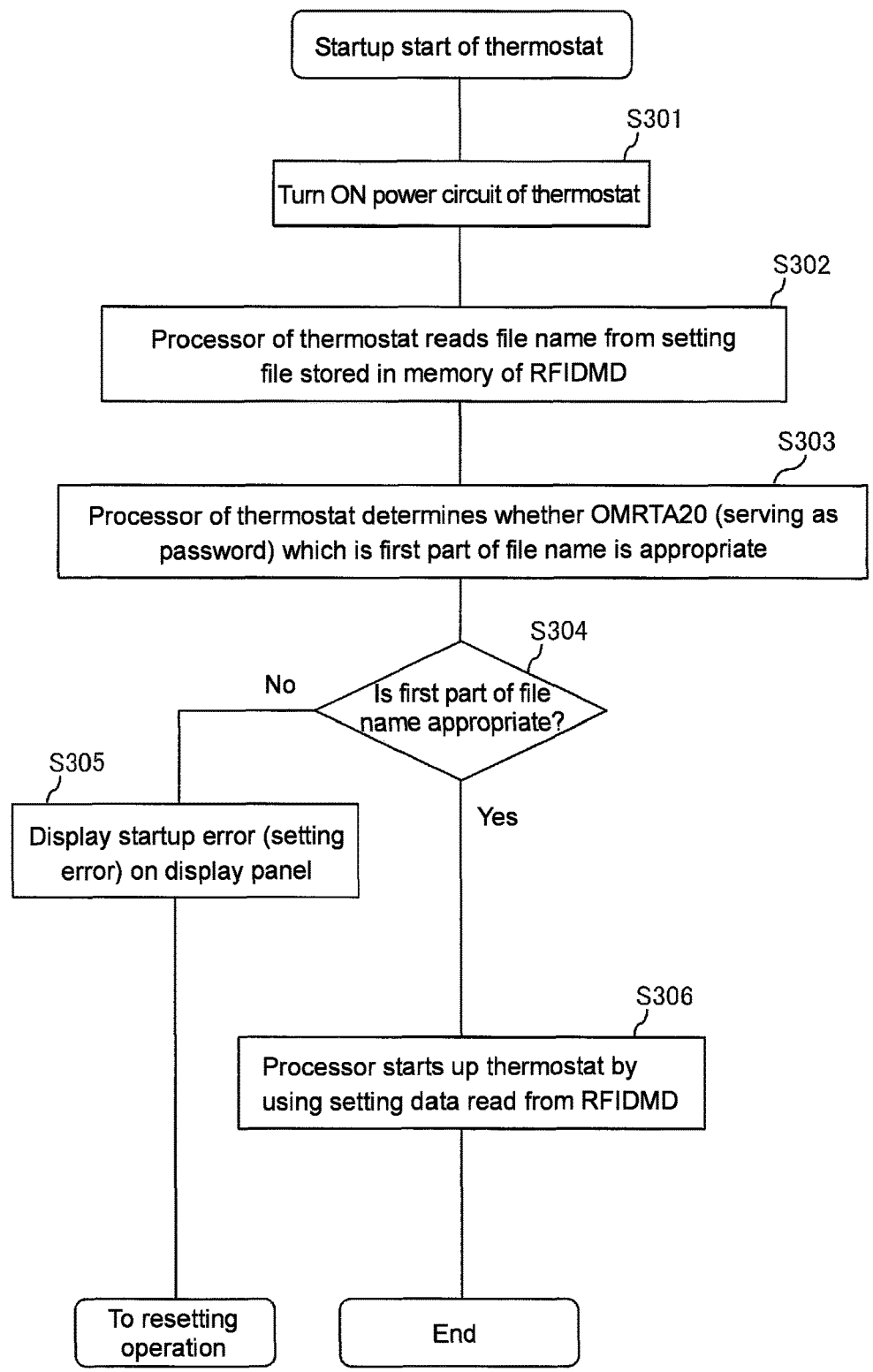
FIG. 9 is a flowchart for describing a startup process of the thermostat in Embodiment 1.

The thermostat in which the delivery inspection operation has been completed is started up as illustrated in FIGS. 8 and 9. Note that, before the startup, a heater drive circuit 41 configured to drive a heater built-in furnace 43 and a temperature sensor 42 configured to measure a temperature of the heater built-in furnace 43 are connected to the thermostat 20.

After the user turns on the power circuit 24 of the thermostat 20 (Step S301), the processor 23 of the thermostat 20 reads a file name from a setting file stored in the memory 6 of the RFID module 10 (Step S302).

In Step S303, the processor 23 determines whether identification information "OMRTA20" which is the first part of the file name serving as a password is appropriate. To be specific, the first part of such a file name is collated with predetermined data stored in the storage element 26 which cannot be accessed wirelessly before shipment.

If a collation result in Step S304 (is the first part of the file name appropriate?) is NO (the first part of the file name is inappropriate), the processor 23 displays a startup error (setting error) on the display panel 22 (Step S305). In this case, a resetting operation (rewriting of setting information) in FIG. 5 is required.

If a collation result in Step S304 (is the first part of the file name appropriate?) is YES (the first part of the file name is appropriate), the processor 23 performs a startup process of the thermostat 20 by using various setting values read from the setting file of the RFID module 10 (Step S306).

Figure 10:
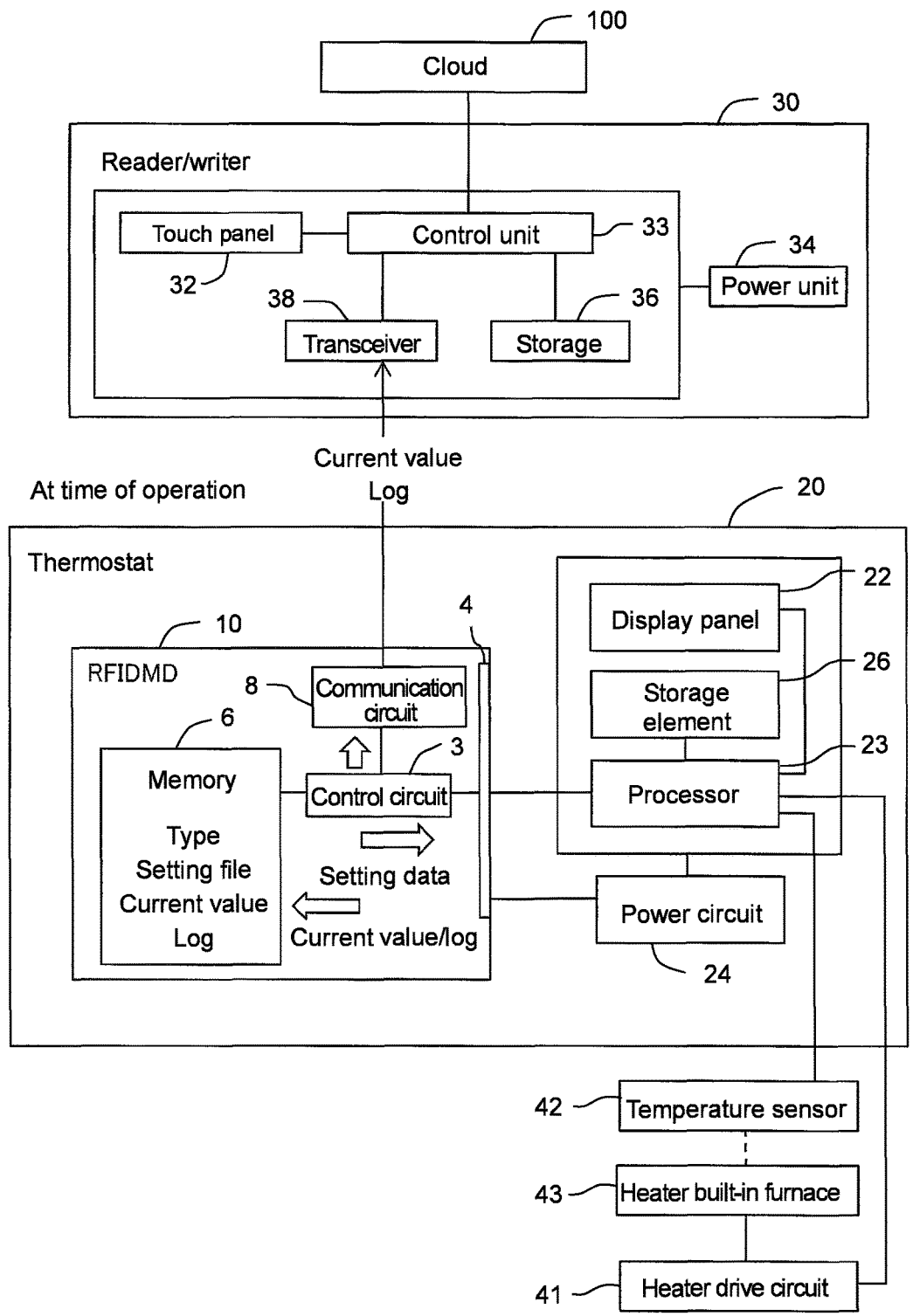
FIG. 10 is a block diagram for describing a state in which the thermostat is operated in Embodiment 1.

The thermostat 20 which has been started up normally transitions to an operating state. During the operation, as shown in FIG. 10, the processor 23 reads a necessary setting value from the setting file of the memory 6 of the RFID module 10 and controls the heater drive circuit 41. In addition, the processor 23 displays a current value (temperature) on the display panel 22 or writes the current value (temperature) and a log to the memory 6 via the control circuit 3 of the RFID module 10.

Also, the control circuit 3 of the RFID module 10 receives a request from the reader/writer 30 and transmits the current value and the log of the memory 6 from the communication circuit 8 to the reader/writer 30. In the reader/writer 30, the control unit 33 receiving the current value and the log via the transceiver 38 transmits the current value and the log to a network such as a cloud 100 in cooperation with the storage 36.

Figure 11:
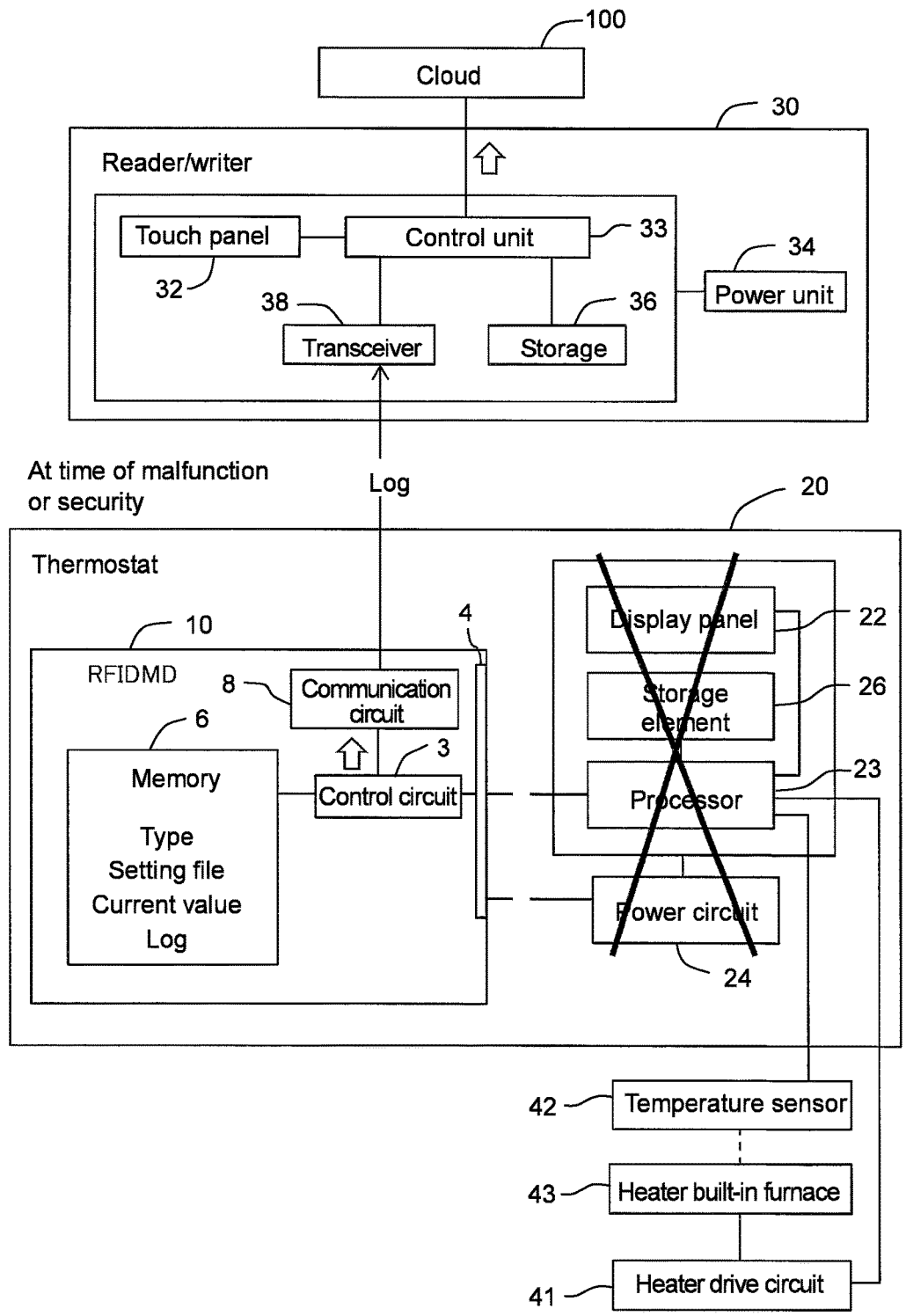
FIG. 11 is a block diagram for describing a state of the thermostat at the time of malfunction/security in Embodiment 1.

According to the thermostat 20, as shown in FIG. 11, the control circuit 3 can receive a request from the reader/writer 30 and transmit a log in the memory 6 from the communication circuit 8 to the reader/writer 30 even if the power circuit 24 is shut down (at the time of malfunction or security). Moreover, the reader/writer 30 transmits such a log to the cloud 100 so that a cause or the like of a malfunction can be rapidly determined.

According to Embodiment 1, when the reader/writer 30 collates a type to be written of setting information input by the user with a type of the thermostat 20 transmitted from the RFID module 10 and it is determined that the two types match with each other, setting information corresponding to the type is wirelessly written to the memory 6 of the RFID module 10.

In this way, since unpacking and wired connection operations are unnecessary because setting information is written wirelessly, as compared with when wired writing is performed, a setting operation can be performed much more efficiently. Moreover, since a collation failure occurs when there is a mistake in an input by the user at the time of setting (for example, a type to be input is wrong) or a write target is different from the user's intention (for example, the transceiver of the reader/writer faces in an unintended direction), erroneous setting due to wireless writing can be prevented. Thus, an erroneous operation of the thermostat 20 including the RFID module 10 can be prevented.

Also, even if an inappropriate setting is performed for any reason (an incorrect setting file is written, a setting file disappears, or unrelated data is written), such an inappropriate setting can be found using a delivery inspection that does not exert a large burden on the user. Since the user is informed of a setting error at the time of startup even if such a delivery inspection is not performed, a chance of a delivery inspection is missed due to human error, or there is a problem in a setting file after a delivery inspection, an erroneous operation of the thermostat 20 including the RFID module 10 can be prevented.

Embodiment 2

Figure 12:
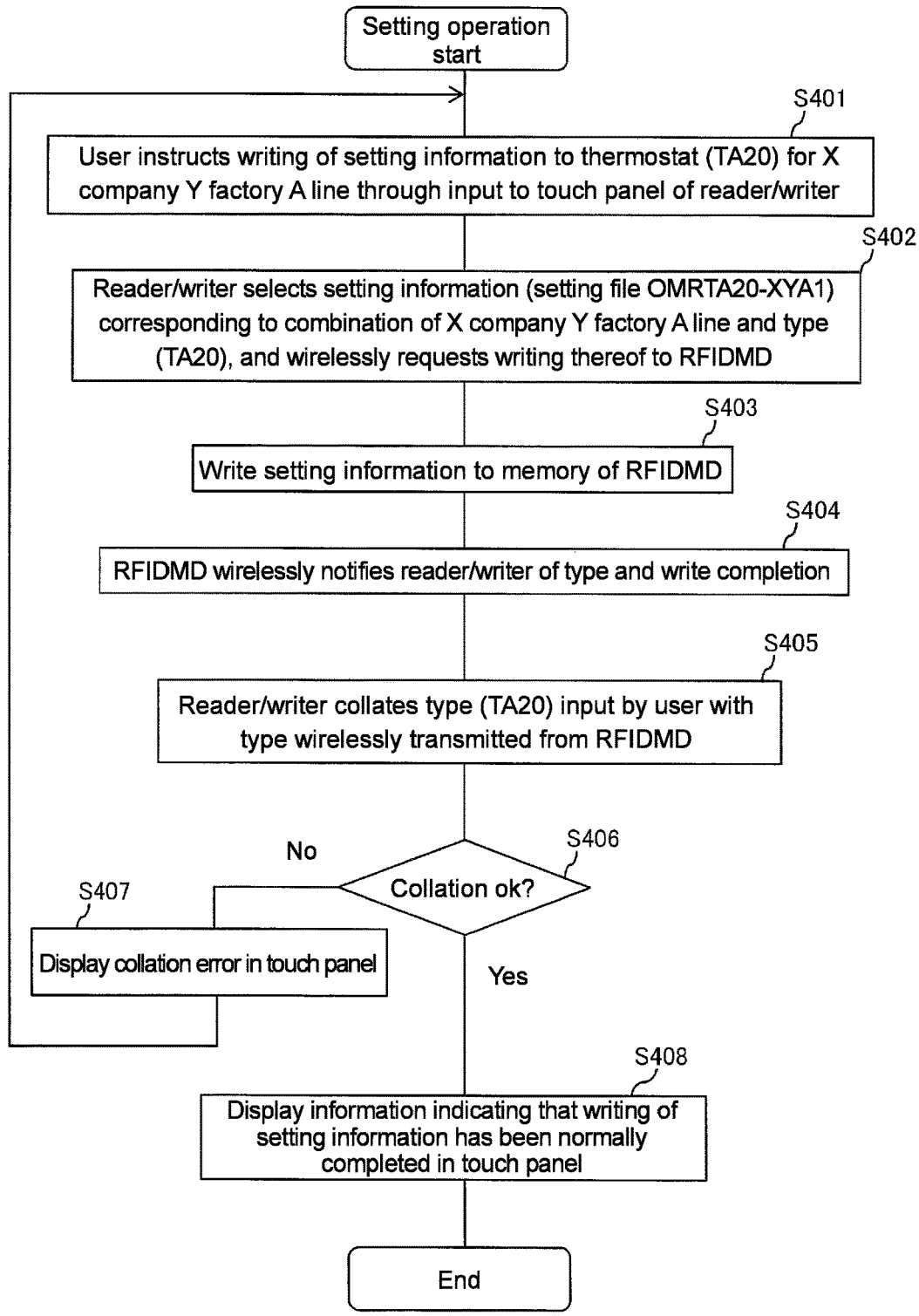
FIG. 12 is a flowchart for describing a setting operation of a wireless communication system according to Embodiment 2.

As shown in FIG. 12, in an embodiment, a setting operation can also be performed on a thermostat 20. First, in Step S401, the user instructs writing of setting information to a thermostat (TA20) for X company Y factory A line through an input to a touch panel 32 of a reader/writer 30 (refer to (a) of FIG. 4).

Subsequently, in Step S402, the reader/writer 30 selects setting information (setting file OMRTA20-XYA1) corresponding to a combination of X company Y factory A line and a type (TA20) from the table as illustrated in (b) of FIG. 4 and wirelessly requests writing to an RFID module 10 (Step S402). Thus, the setting information is written to a memory 6 of the RFID module 10 (Step S403).

Subsequently, in Step S404, the RFID module 10 wirelessly notifies the reader/writer 30 of the type and write completion. The reader/writer 30 receives the type and the write completion and collates a type (TA20) input by the user in S401 with the type wirelessly transmitted from the RFID module 10 in S404 (Step S405).

Subsequently, if a collation result in Step S406 (collation OK?) is NO (the types do not match), a collation error is displayed in the touch panel 32 (Step S407). In addition, if a collation result in S406 (collation OK?) is YES (the types match), information indicating that the writing of the setting information has been completed normally is displayed in the touch panel 32 (Step S408).

In Embodiment 2 in FIG. 12, there is an advantage in that an interaction between the reader/writer 30 and the RFID module 10 is reduced.

Embodiment 3

Figure 13:
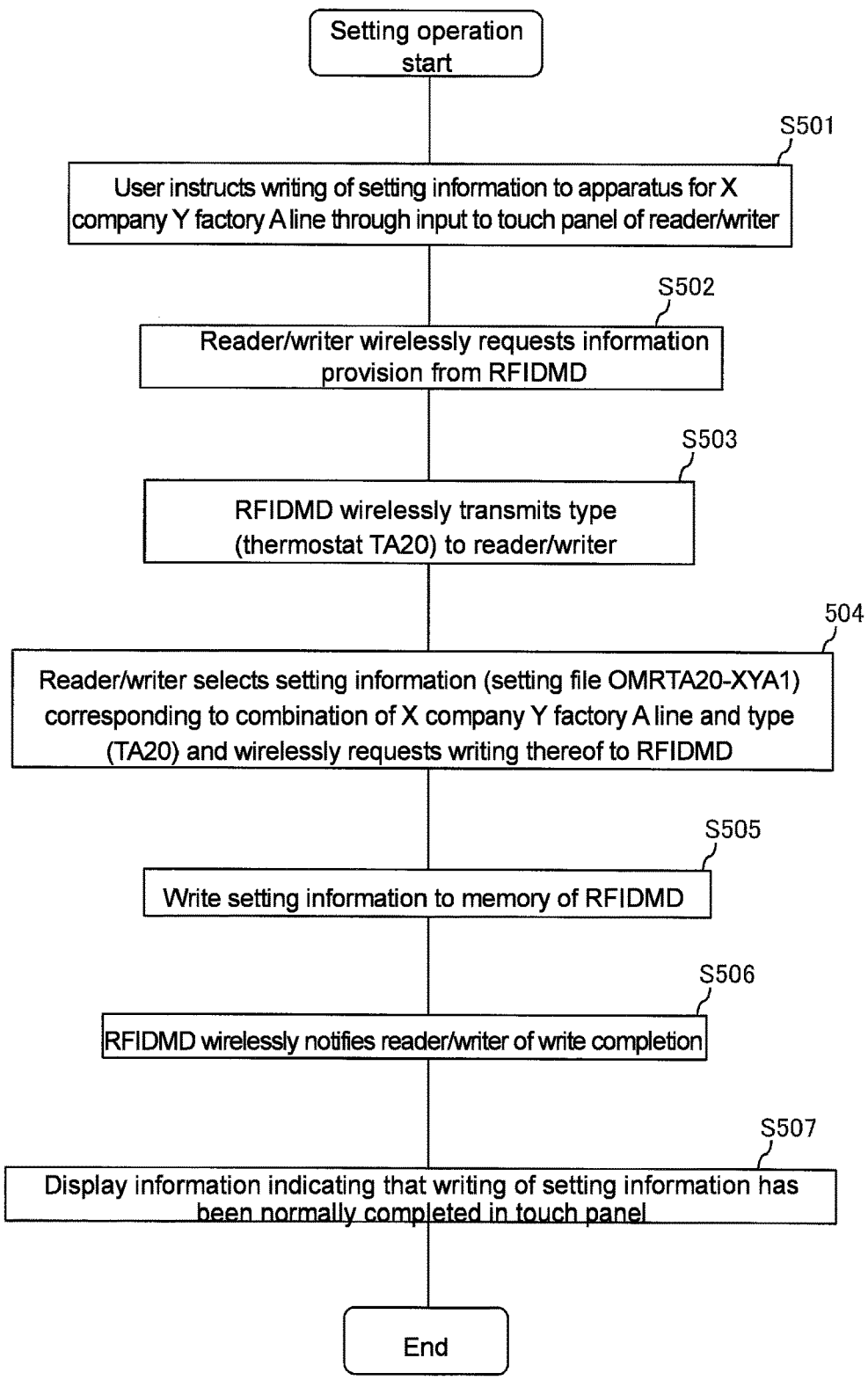
FIG. 13 is a flowchart for describing a setting operation of a wireless communication system according to Embodiment 3.
Figure 14:
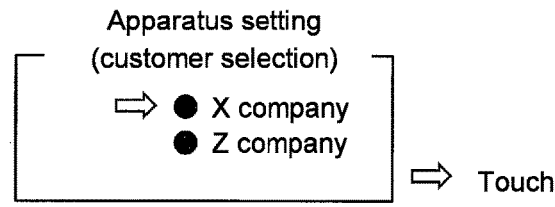
FIG. 14 is an explanatory diagram for describing an input process of a setting operation in Embodiment 3.
Figure 14:
Figure 14:
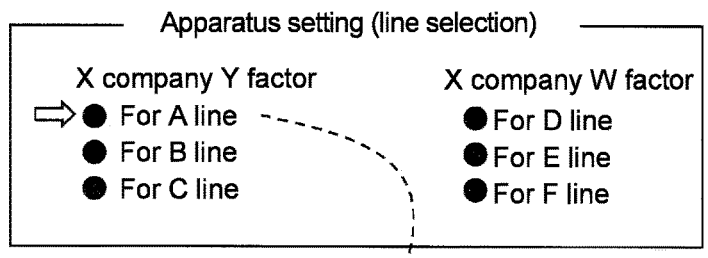

As shown in FIGS. 13 and 14, in an embodiment, a setting operation of a thermostat 20 can also be performed. First, in Step S501, the user instructs writing of setting information to an apparatus for X company Y factory A line through an input to a touch panel 32 of a reader/writer 30 (refer to (a) of FIG. 14).

Subsequently, in Step S502, the reader/writer 30 wirelessly requests information provision from the RFID module 10. The RFID module 10 receives the information provision and wirelessly transmits a type (thermostat TA20) to the reader/writer 30 (Step S503).

Subsequently, in Step S504, the reader/writer 30 selects setting information (setting file OMRTA20-XYA1) corresponding to a combination of X company Y factory A line and the type (TA20) from a table illustrated in (b) of FIG. 14 and wirelessly requests writing to the RFID module 10 (Step S504). Thus, the setting information is written to the memory 6 of the RFID module 10 (Step S505).

Subsequently, in Step S506, the RFID module 10 wirelessly notifies the reader/writer 30 of write completion and information indicating that the writing of the setting file has been completed normally is displayed in the touch panel 32 (Step S507).

In Embodiment 3 in FIG. 13, there is an advantage in that a setting operation can be rapidly performed because the user may input only a destination (X company Y factory A line) and need not select a type or form of the apparatus.

Embodiment 4

Figure 15:
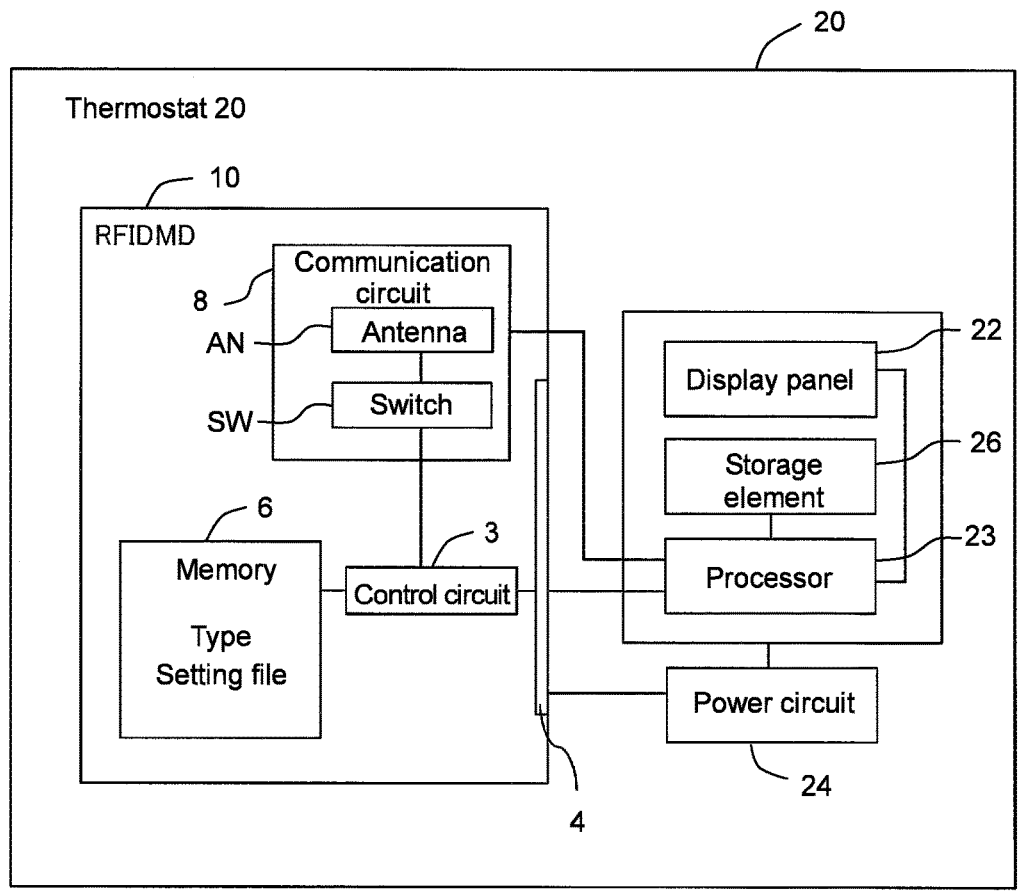
FIG. 15 is a block diagram showing a thermostat according to Embodiment 4.

In an embodiment, a thermostat 20 can also be configured as illustrated in FIG. 15. In other words, a communication circuit 8 of an RFID module 10 is configured to include an antenna AN (for example, an antenna separated from a control circuit 3) and a switch SW. Here, the control circuit 3 is connected to the antenna AN via the switch SW and the antenna AN and the switch SW of the communication circuit 8 are connected to a processor 23. The processor 23 controls (turns on or off) the switch SW. Note that the processor 23 can receive a read request from a reader/writer 30 from the antenna AN regardless of a state (on or off) of the switch SW.

The switch SW is a normally-on type in which the switch SW is on when a power supply of the thermostat 20 is off and is on at the time of setting (writing of the setting file to the RFID module 10) in the passive state described with reference to Embodiments 1 to 3.

Figure 16:
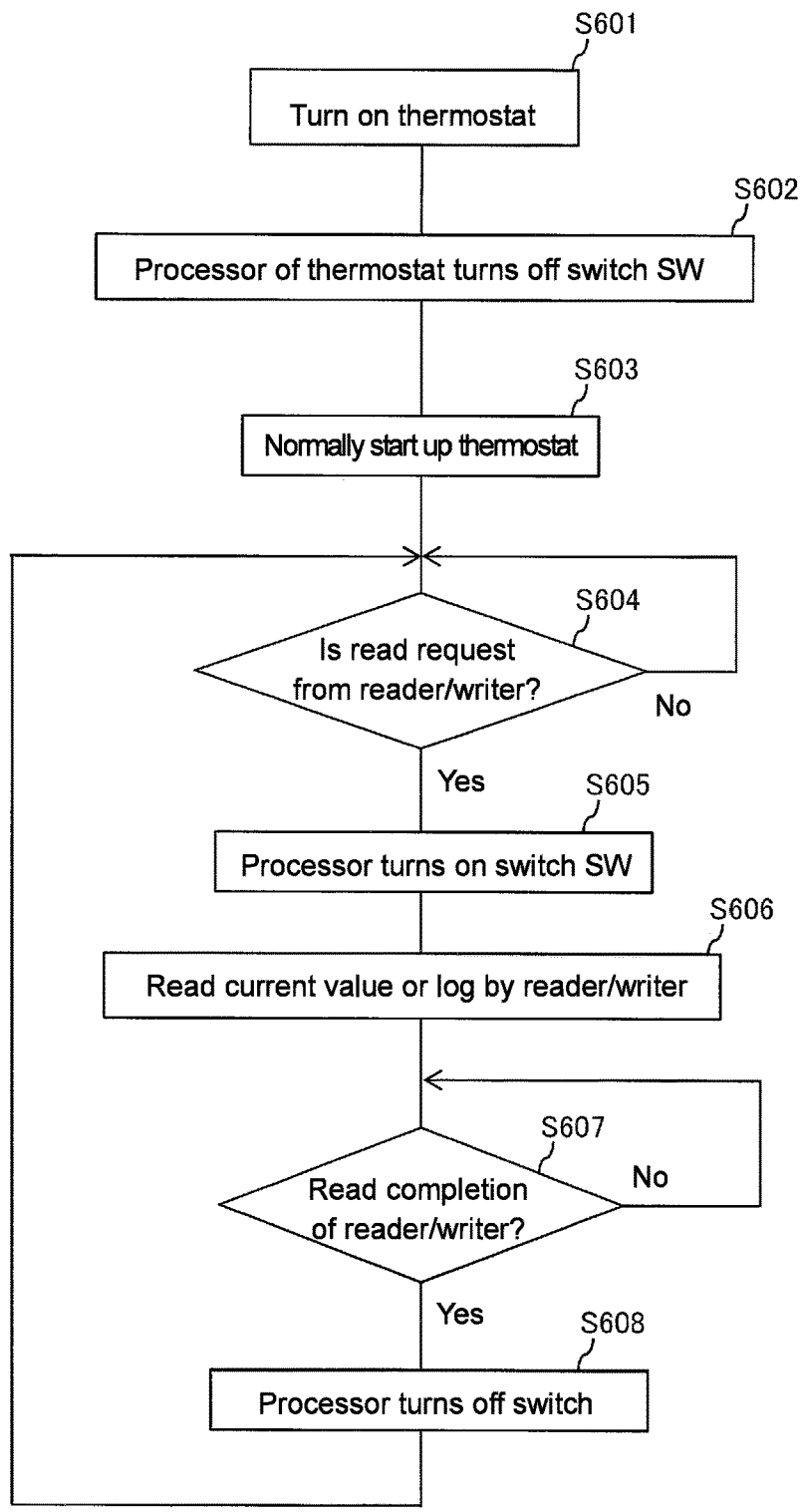
FIG. 16 is a flowchart for describing an operation of the thermostat according to Embodiment 4.
Figure 17:
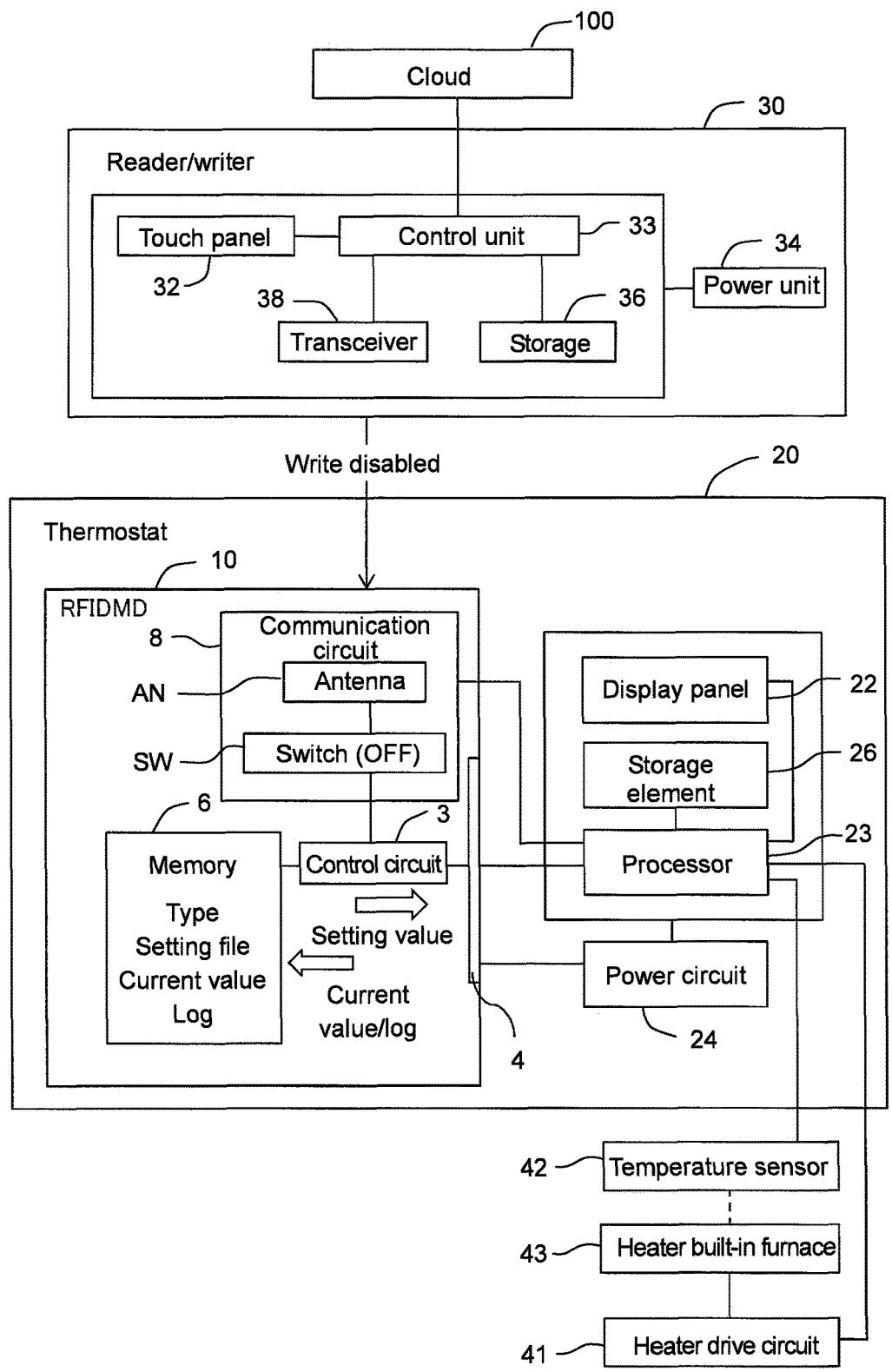
FIG. 17 is a block diagram for describing a state in which the thermostat is operated (switch SW OFF) in Embodiment 4.
Figure 18:
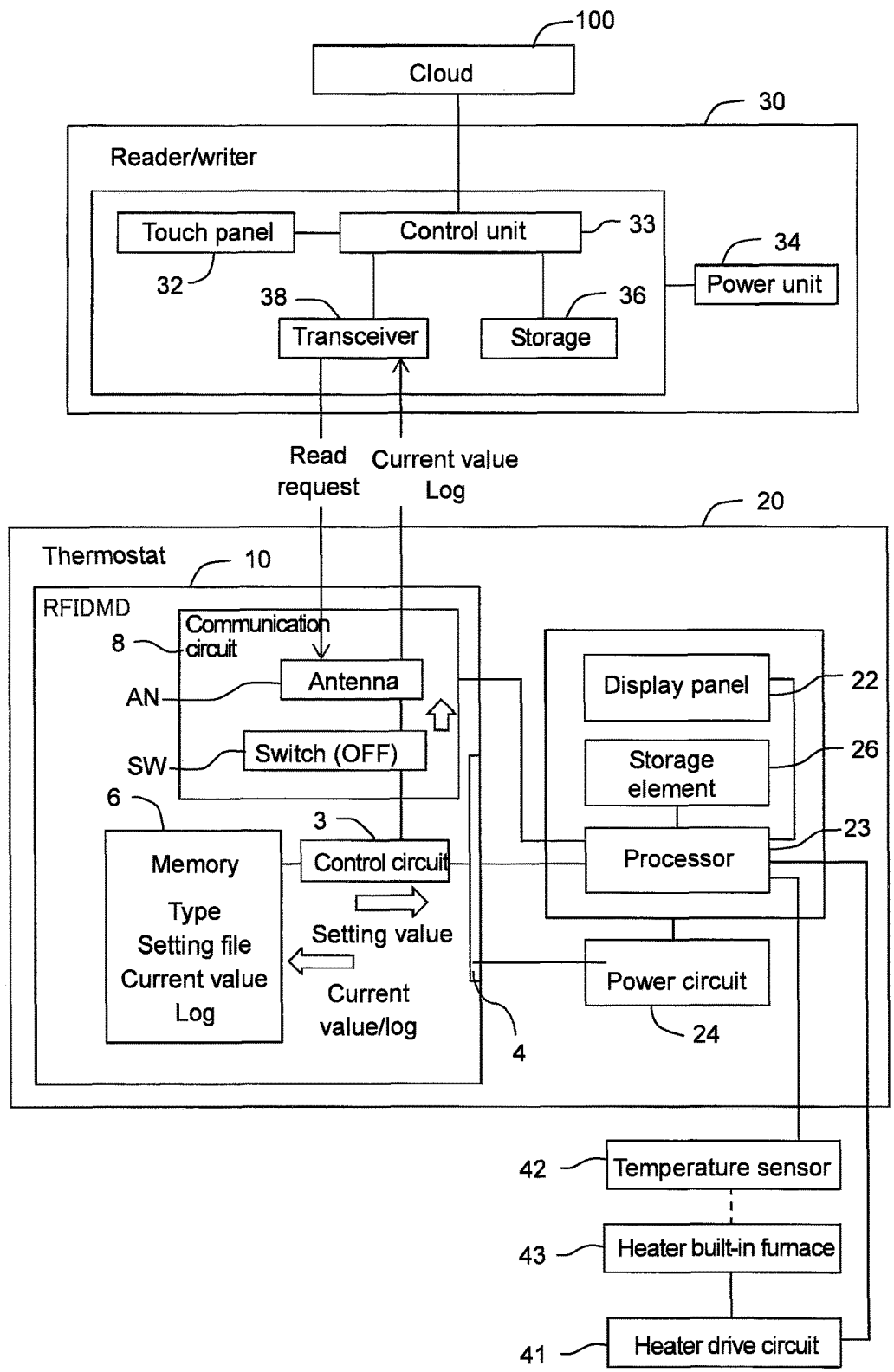
FIG. 18 is a block diagram for describing a state in which the thermostat is operated (switch SW ON) in Embodiment 4.

The thermostat 20 in FIG. 15 operates, for example, as illustrated in FIGS. 16 to 18. In other words, after the power supply of the thermostat 20 is turned on in Step S601, the processor 23 of the thermostat 20 turns off the switch SW (Step S602). Thus, writing to the memory 6 by using the reader/writer 30 is prevented.

If the thermostat 20 is started up normally in Step S603, the processor 23 controls the heater drive circuit 41 by using various setting values read from a setting file of the memory 6 of the RFID module 10 and writes a current value (temperature) and a log to the memory 6 of the RFID module 10 (refer to FIG. 17).

After that, the process proceeds to a process of Step S604 (is there a read request from the reader/writer 30?). In addition, if a result in Step S604 is YES (the processor 23 has detected the read request from the reader/writer 30), the processor 23 turns on the switch SW (Step S605) and the control circuit 3 according to the read request transmits the current value or the log of the memory 6 to the reader/writer 30 (refer to FIG. 18). Thus, the current value or the log is read to the reader/writer 30 (Step S606). Moreover, if the reading of the reader/writer 30 has been completed (YES in Step S607), the processor 23 turns off the switch SW (Step S608) and the process returns to the process of Step S604.

In Embodiment 4, while the thermostat 20 is in operation, the switch SW is off in a period other than a read period of the reader/writer 30, such that writing to the memory 6 by using the reader/writer 30 can be prevented. Furthermore, in the RFID module 10, writing to the memory 6 cannot be performed in a read period from the memory 6 by using the reader/writer 30. Therefore, while the thermostat 20 is in operation, writing of the RFID module 10 to the memory 6 is effectively enabled and thus an erroneous operation of the thermostat 20 due to erroneous rewriting of a setting file of the memory 6 while the thermostat 20 is in operation can be avoided. Note that, since the switch SW is on when the power supply of the thermostat 20 is off, setting information can be written to the memory 6 described in Embodiments 1 to 3.

Figure 19:
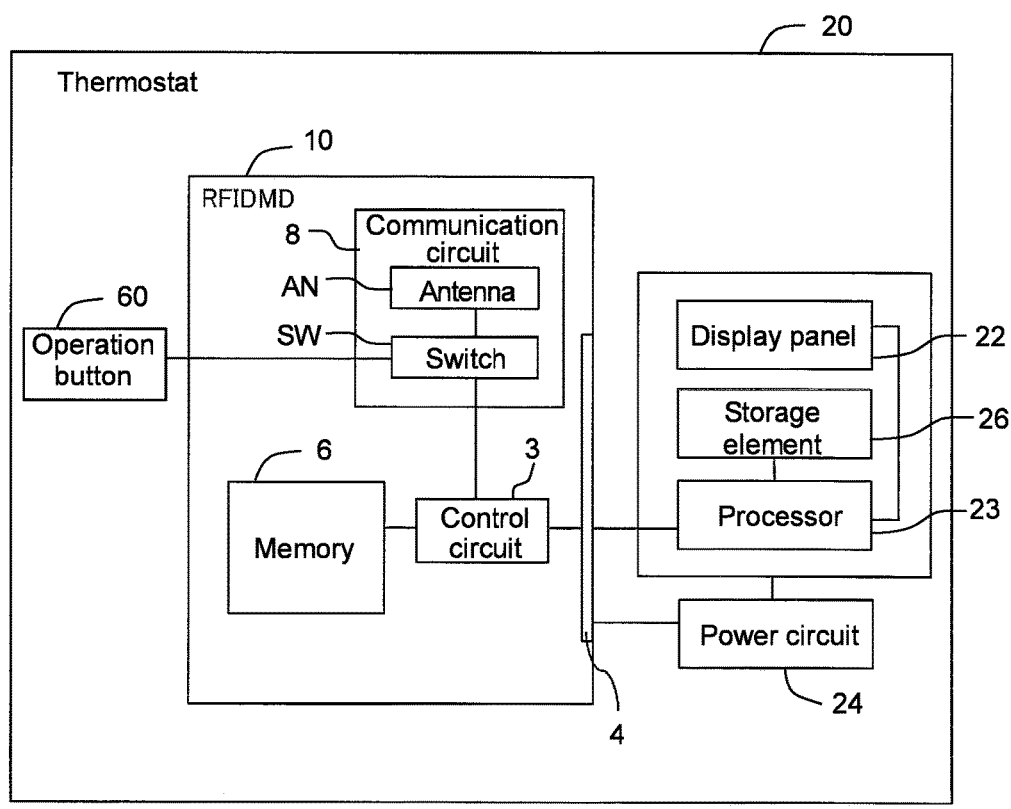
FIG. 19 is a block diagram showing another configuration of the thermostat in Embodiment 4.

Note that the switch SW of Embodiment 4 is not limited to the configuration of FIG. 15 and may have a configuration in which the user directly turns on/off the switch SW by using an operation button 60 configured in the periphery (case surface of the thermostat 20) of the display panel 22 illustrated in FIG. 19. In this case, situations in which writing for another apparatus is erroneously performed for the thermostat 20 can be avoided by turning off the switch SW through an operation button 60 of the thermostat 20 as necessary (for example, when writing is performed for a neighboring apparatus using a reader/writer).

Embodiment 5

Figure 20:
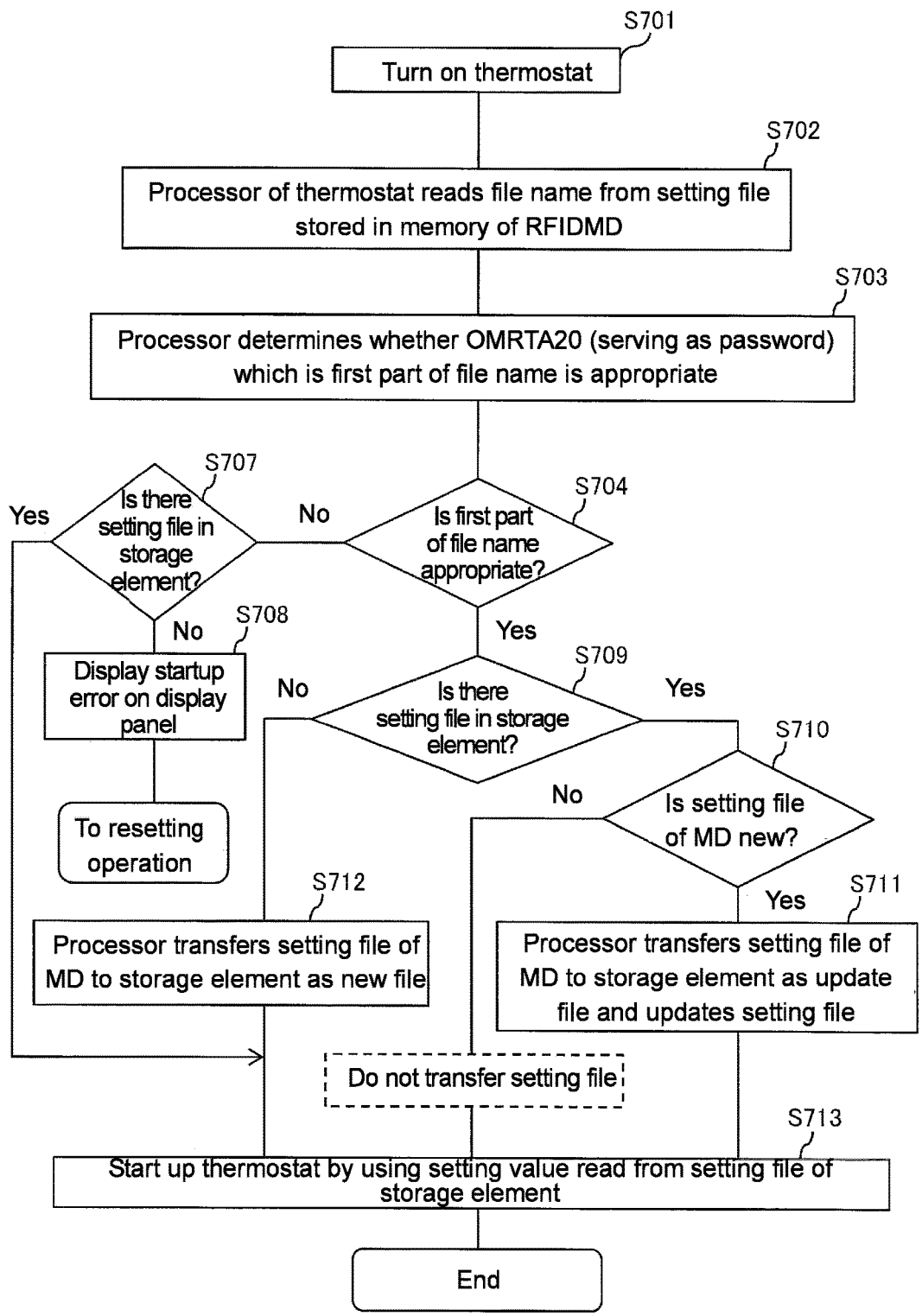
FIG. 20 is a flowchart for describing a startup process of a thermostat in Embodiment 5.
Figure 21:
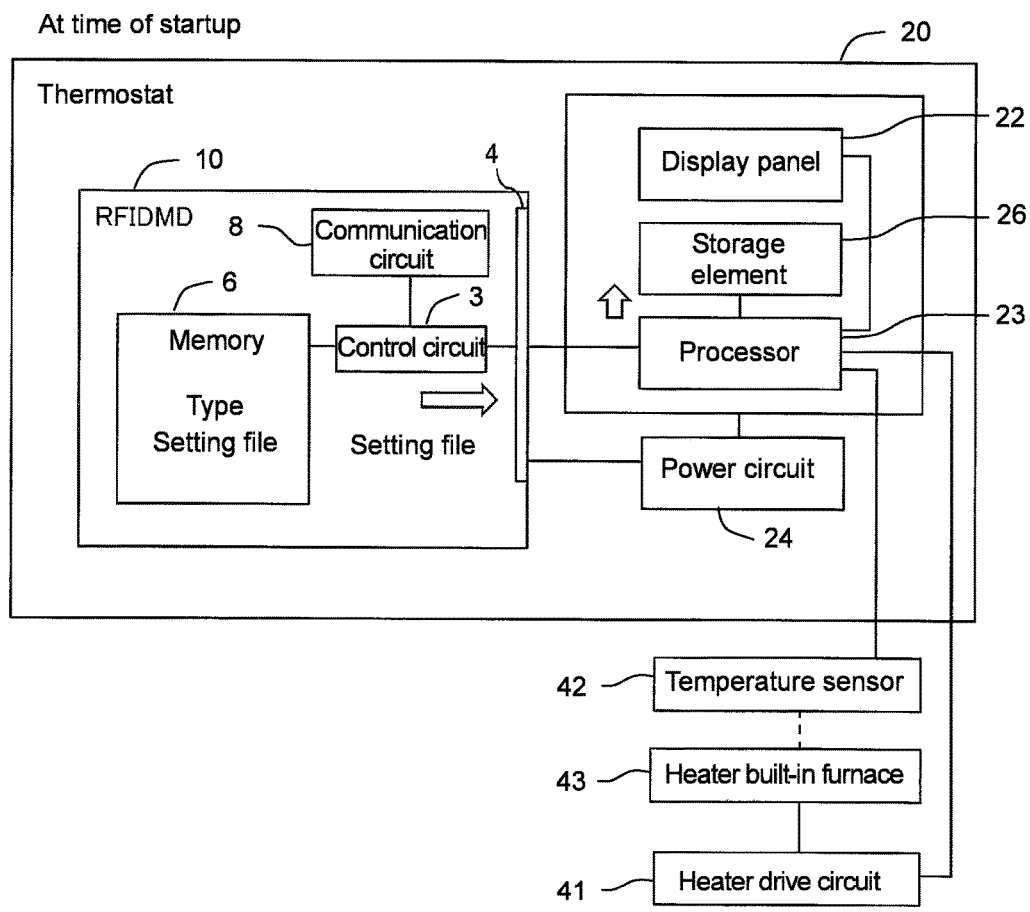
FIG. 21 is a block diagram for describing a state in which the thermostat is started up in Embodiment 5.
Figure 22:
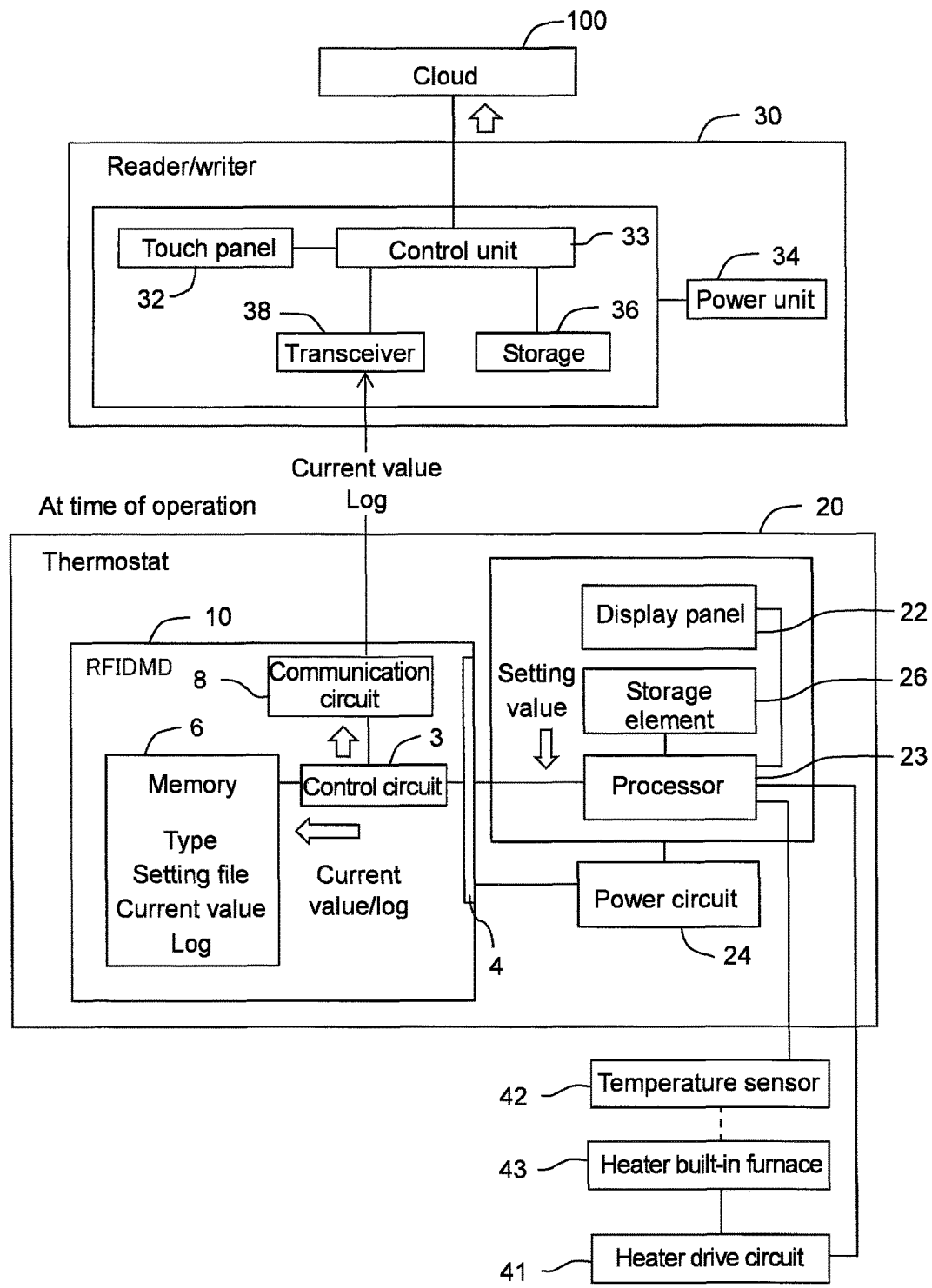
FIG. 22 is a block diagram for describing a state in which the thermostat is operated in Embodiment 5.

In an embodiment, a thermostat 20 can also be configured as illustrated in FIGS. 20 to 22.

As shown in FIG. 20, when a power supply of the thermostat 20 is turned on in Step S701, a processor 23 of the thermostat 20 reads a file name from a setting file stored in a memory 6 of an RFID module 10 (Step S702) and determines whether the first part of the file name "OMRTA20" which is identification information and served as a password is appropriate (Step S703).

Subsequently, if a determination result in Step S704 (is the first part of the file name appropriate?) is YES (appropriate), the process proceeds to a process of Step S709 (is there a setting file in the storage element 26 of the thermostat 20?). In addition, as shown in FIGS. 20 and 21, if a determination result in Step S709 is NO, the processor 23 transfers the setting file of the memory 6 of the RFID module 10 as a new file to the storage element 26 which cannot be accessed wirelessly (Step S712), reads a required setting value from a setting file of the storage element 26, and starts up the thermostat 20 (Step S713).

If a determination result in Step S709 is YES, the processor 23 determines whether the setting file of the RFID module 10 is a new file on the basis of version information (ending of the file name) (Step S710). In addition, as shown in FIGS. 20 and 21, if a determination result in Step S710 is YES (the setting file is a new file), the processor 23 transfers the setting file of the RFID module 10 as an update file to the storage element 26, replaces the previous setting file with the new setting file (Step S711), reads a required setting value from the setting file of the storage element 26, and starts up the thermostat 20 (Step S713).

If a determination result in Step S710 is NO (the setting file is not a new setting file), the processor 23 reads a required setting value from the setting file (previously transferred setting file) of the storage element 26 without transferring the setting file and starts up the thermostat 20 (Step S713).

Note that, if a determination result in Step S704 (is the first part of the file name appropriate?) is NO (inappropriate), the process proceeds to a process of Step S707 (is there a setting file in the storage element 26?). In addition, if a determination result in Step S707 is YES (there is a setting file), a required setting value is read from the setting file (previously transferred setting file) of the storage element 26 and the thermostat 20 is started up (Step S713). On the other hand, if a determination result in Step S707 is NO (there is no setting file), a startup error is displayed on a display panel 22 (Step S708) and the process proceeds to a resetting operation (refer to FIG. 5).

If the thermostat 20 starts up normally, as shown in FIG. 22, the processor 23 controls a heater drive circuit 41 by reading a required setting value from the setting file of the storage element 26 in the thermostat 20 and writes a current value (temperature) and a log to the memory 6 of the RFID module 10 via a control circuit 3.

Moreover, when a read request of a current value or a log (operation information) is received from the reader/writer 30, the control circuit 3 transmits a current value (temperature) or a log of the memory 6 from the communication circuit 8 to the reader/writer 30. The reader/writer 30 can also transmit the current value or the log transmitted from the thermostat 20 to a network (cloud 100 or the like).

In the thermostat 20 according to Embodiment 5, at the time of startup, the processor 23 transfers the setting file of the memory 6 to the storage element 26 which cannot be accessed wirelessly and performs a startup process. In addition, since a required setting value is read from the setting file of the storage element 26 during an operation, an erroneous operation of the thermostat 20 can be prevented even if the setting file of the memory 6 is erroneously rewritten while the thermostat 20 is in operation.

CONCLUSION

The types (type information) disclosed in the above-described embodiments are information for specifying types of electronic apparatuses and may be types themselves or types specified from a serial number or the like. Furthermore, specification information may be destination information and information of a sub-divided lower-ordered type. Identification information (OMRTA20 in the above-described example) is information for identification of setting information (indicating a setting file for Thermostat TA20 manufactured by OMRON Corporation in the above-described example) and can also serve as a password.

An electronic apparatus according to the present invention includes a wireless communication module including an antenna, a control circuit, a memory connected to the control circuit, and a wired communication port, a processing unit connected to the wireless communication module via the wired communication port, and a switch configured to electrically connect or interrupt the antenna and the control circuit.

According to the above configuration, since writing to the memory is impossible because the switch between the antenna and the control circuit is turned off, an erroneous operation of the electronic apparatus including the wireless communication module with the wired communication port can be prevented.

In the electronic apparatus, the switch can also be configured to be on when a power supply of the electronic apparatus is off.

In the electronic apparatus, the switch can also be configured to be turned on or off by the processing unit.

The electronic apparatus includes an operation unit arranged in a case surface of the electronic apparatus, and the switch can also be configured to be turned on or off by the operation unit.

In the electronic apparatus, the processing unit can also be configured to turn off the switch when the power supply of the electronic apparatus is turned on.

In the electronic apparatus, the processing unit can also be configured to detect a read request from the outside via the antenna.

In the electronic apparatus, the processing unit can also be configured to turn on the switch when the read request is detected.

In the electronic apparatus, the control circuit can also be configured to transmit operation information of the electronic apparatus written to the memory from the antenna via the switch in response to the read request.

In the electronic apparatus, the processing unit can also be configured to turn off the switch when reading from the outside is completed.

In the electronic apparatus, the control circuit can also be configured not to respond to a write request in a period corresponding to the read request.

In the electronic apparatus, setting information is written to the memory and the processing unit can also be configured to operate the electronic apparatus by using the setting information.

In the electronic apparatus, the processing unit can also be configured to write the operation information of the electronic apparatus to the memory via the wired communication port.

In the electronic apparatus, the wireless communication module can also be configured to be an RFID module.

A wireless communication system includes: the electronic apparatus; and a reader/writer configured to write setting information of the electronic apparatus to the memory and read operation information of the electronic apparatus from the memory.

A wireless communication system according to the present invention is a wireless communication system including: an electronic apparatus including a wireless communication module having a wired communication port and a memory and a processing unit connected to the wireless communication module via the wired communication port; and a reader/writer capable of performing wireless communication with the wireless communication module, wherein a type of the electronic apparatus is stored in the memory of the wireless communication module, the reader/writer collates a type of a write target of setting information input by a user with a type of the electronic apparatus transmitted from the wireless communication module, the setting information corresponding to the type is wirelessly written to the memory of the wireless communication module when it is determined that the two types match with each other. In other words, in the case of a collation failure in which the two types do not match with each other, wireless writing of the setting information by the reader/writer is not performed.

In this way, since unpacking and wired connection operations are unnecessary by wirelessly writing setting information, as compared with performing wired writing, a setting operation can be performed much more efficiently.

Moreover, since a collation failure occurs when there is a mistake in an input by the user (for example, a type to be input is wrong) or a write target is different from the user's intention (for example, the reader/writer faces in an unintended direction), erroneous setting due to wireless writing can be prevented. Thus, an erroneous operation of the electronic apparatus including the wireless communication module can be prevented.

A wireless communication system according to the present invention is a wireless communication system including: an electronic apparatus including a wireless communication module having a wired communication port and a memory and a processing unit connected to the wireless communication module via the wired communication port; and a reader/writer capable of performing wireless communication with the wireless communication module, wherein a type of the electronic apparatus is stored in the memory of the wireless communication module, and the reader/writer wirelessly writes setting information corresponding to the type of the write target to the memory of the wireless communication module when receiving a type of a write target as an input by a user, collates a type of the electronic apparatus wirelessly transmitted from the wireless communication module with the type of the write target input by the user in accordance with the writing, and notifies information indicating that the writing has been normally completed when it is determined that the two types match with each other.

Also with such a configuration, since the user is notified of a collation failure when there is a mistake in an input of the user (for example, a type to be input is wrong) or a write target is different from the user's intention (for example, the reader/writer faces in an unintended direction), erroneous setting due to wireless writing can be prevented. Thus, an erroneous operation of the electronic apparatus including the wireless communication module can be prevented.

A wireless communication system according to the present invention is a wireless communication system including: an electronic apparatus including a wireless communication module having a wired communication port and a memory and a processing unit connected to the wireless communication module via the wired communication port; and a reader/writer capable of performing wireless communication with the wireless communication module, wherein a type of the electronic apparatus is stored in the memory of the wireless communication module, and the reader/writer selects setting information corresponding to a combination of specification information input by a user and the type of the electronic apparatus wirelessly transmitted from the wireless communication module and wirelessly writes the setting information to the memory of the wireless communication module.

With such a configuration, since the user need not input a kind or a type of electronic apparatus, input mistakes are reduced and an erroneous operation of the electronic apparatus including the wireless communication module can be reduced. Furthermore, quick setting processing can be performed.

In the wireless communication system, the reader/writer can also be configured to select the setting information corresponding to a combination of specification information input by the user and a type of the electronic apparatus wirelessly transmitted from the wireless communication module and write the setting information to the memory of the wireless communication module.

In the wireless communication system, identification information is included in the setting information and the processing unit of the electronic apparatus can also be configured to perform a startup process of the electronic apparatus by using the setting information only when it is determined that the identification information is appropriate.

In the wireless communication system, the electronic apparatus includes a storage element which is not capable of wireless access and the processing unit can also be configured to determine whether the identification information is appropriate by collating the identification information with predetermined data of the storage element.

In the wireless communication system, the setting information can also include the information of the type and the specification information.

In the wireless communication system, the wireless communication module of the electronic apparatus can also be configured to wirelessly transmit, when the setting information is not written, information indicating that the setting information is not written and when the setting information is written, the information of the type included in the setting information and the specification information to the reader/writer in response to a wireless request from the reader/writer.

In the wireless communication system, the setting information further includes version information and the wireless communication module of the electronic apparatus can also be configured to wirelessly transmit the version information included in the setting information to the reader/writer if the setting information is written.

In the wireless communication system, the reader/writer can also be configured to collate the information of the type, the specification information, and the version information with delivery inspection information and provide a notification of the collation result.

In the wireless communication system, the processing unit can also be configured to write operation information of the electronic apparatus to the memory of the wireless communication module via the wired communication port when the electronic apparatus is operated.

In the wireless communication system, the reader/writer can also be configured to wirelessly read the operation information from the memory of the wireless communication module.

In the wireless communication system, the reader/writer can also be configured to be able to be connected to a network and transmit the operation information wirelessly read from the memory of the wireless communication module to the network.

In the wireless communication system, the wireless communication module may be an RFID module.

A reader/writer according to the present invention is a reader/writer capable of performing wireless communication with an electronic apparatus including a wireless communication module having a wired communication port and a memory and a processing unit connected to the wireless communication module via the wired communication port, wherein a type of a write target of setting information input by a user is collated with a type of the electronic apparatus wirelessly transmitted from the wireless communication module of the electronic apparatus, and the setting information corresponding to the type is wirelessly written to the memory of the wireless communication module when it is determined that the types match.

A reader/writer according to the present invention is a reader/writer capable of perform wireless communication with an electronic apparatus including a wireless communication module having a wired communication port and a memory and a processing unit connected to the wireless communication module via the wired communication port, wherein, when a type of a write target is input by a user, setting information corresponding to the type of the write target is wirelessly written to the memory of the wireless communication module, a type of the electronic apparatus wirelessly transmitted from the wireless communication module is collated with the type of the write target input by the user in accordance with the writing, and a notification of information indicating that the writing has been normally completed is provided when it is determined that the types match.

A reader/writer according to the present invention is a reader/writer capable of performing wireless communication with an electronic apparatus including a wireless communication module having a wired communication port and a memory and a processing unit connected to the wireless communication module via the wired communication port, wherein the reader/writer wirelessly writes setting information corresponding to a combination of specification information input by the user and a type of the electronic apparatus wirelessly transmitted from the wireless communication module to the memory of the wireless communication module.

An electronic apparatus according to the present invention is an electronic apparatus including: a wireless communication module including a wired communication port and a memory and a processing unit connected to the wireless communication module via the wired communication port, wherein setting information is written to the memory of the wireless communication module, the processing unit determines whether identification information included in the setting information is appropriate and performs a startup process by using the setting information only when it is determined that the identification information is appropriate.

In the electronic apparatus, the electronic apparatus includes a storage element which is not capable of wireless access and the processing unit can also be configured to determine whether the identification information is appropriate by collating the identification information with predetermined data of the storage element.

The present invention is not limited to the above-described embodiments and various modifications thereof are possible within the scope of the claims. Embodiments obtained by appropriately combining technical means disclosed in different embodiments are also included in the technical scope of the present invention. New technical features can also be formed by combining technical means disclosed in embodiments.

The invention claimed is:

1. An electronic apparatus comprising:
    a wireless communication module including an antenna, a control circuit, a memory connected to the control circuit, and a wired communication port;
    a processing unit connected to the wireless communication module via the wired communication port; and
    a switch configured to electrically connect or interrupt the antenna and the control circuit,
    wherein the processing unit detects a read request from an outside via the antenna during a period that a connection between the antenna and the control circuit is interrupted by the switch.

2. The electronic apparatus according to claim 1, wherein the switch is turned on when a power supply of the electronic apparatus is turned off.

3. The electronic apparatus according to claim 2, wherein the switch is turned on or off by the processing unit.

4. The electronic apparatus according to claim 3, comprising:
    an operation unit arranged on a case surface of the electronic apparatus,
    wherein the switch is turned on or off by the operation unit.

5. The electronic apparatus according to claim 3, wherein the processing unit turns off the switch when the power supply of the electronic apparatus is turned on.

6. The electronic apparatus according to claim 5, wherein the processing unit turns on the switch when the read request is detected.

7. The electronic apparatus according to claim 6, wherein the control circuit transmits operation information of the electronic apparatus written to the memory from the antenna via the switch in response to the read request.

8. The electronic apparatus according to claim 1, wherein the switch is turned on or off by the processing unit.

9. The electronic apparatus according to claim 8, comprising:
    an operation unit arranged on a case surface of the electronic apparatus,
    wherein the switch is turned on or off by the operation unit.

10. The electronic apparatus according to claim 8, wherein the processing unit turns off the switch when the power supply of the electronic apparatus is turned on.

11. The electronic apparatus according to claim 10, wherein the processing unit turns on the switch when the read request is detected.

12. The electronic apparatus according to claim 11, wherein the control circuit transmits operation information of the electronic apparatus written to the memory from the antenna via the switch in response to the read request.

13. The electronic apparatus according to claim 12, wherein the control circuit does not respond to a write request in a period corresponding to the read request.

14. The electronic apparatus according to claim 11, wherein the processing unit turns off the switch when a reading from the outside is completed.

15. The electronic apparatus according to claim 1, wherein setting information is written to the memory, and
the processing unit operates the electronic apparatus by using the setting information.

16. The electronic apparatus according to claim 1, wherein the processing unit writes the operation information of the electronic apparatus to the memory via the wired communication port.

17. The electronic apparatus according to claim 1, wherein the wireless communication module is an RFID module.

18. A wireless communication system comprising:
the electronic apparatus according to claim 1; and
a reader/writer configured to perform writing of setting information of the electronic apparatus to the memory and reading of operation information of the electronic apparatus from the memory.

\* \* \* \* \*